US011601835B2

(12) United States Patent
Huang et al.

(10) Patent No.: US 11,601,835 B2
(45) Date of Patent: Mar. 7, 2023

(54) BEAM DETECTION METHOD AND APPARATUS

(71) Applicant: China Academy of Telecommunications Technology, Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 43 days.

(21) Appl. No.: 16/761,208

(22) PCT Filed: Oct. 19, 2018

(86) PCT No.: PCT/CN2018/111069
§ 371 (c)(1),
(2) Date: May 1, 2020

(87) PCT Pub. No.: WO2019/085775
PCT Pub. Date: May 9, 2019

(65) Prior Publication Data
US 2020/0259574 A1 Aug. 13, 2020

(30) Foreign Application Priority Data

Nov. 3, 2017 (CN) .......................... 201711071524.X

(51) Int. Cl.
*H04B 7/0408* (2017.01)
*H04B 17/309* (2015.01)
(Continued)

(52) U.S. Cl.
CPC .......... *H04W 24/10* (2013.01); *H04B 7/0408* (2013.01); *H04B 17/309* (2015.01);
(Continued)

(58) Field of Classification Search
CPC .. H04B 7/02–12; H04B 17/0082–3913; H04L 5/003–0098; H04W 16/28;
(Continued)

(56) References Cited

U.S. PATENT DOCUMENTS 9,246,216 B2 1/2016 Harel et al.
2009/0252091 A1 10/2009 Tang et al.
(Continued)

FOREIGN PATENT DOCUMENTS

CN 103220076 A 7/2013
CN 103716081 A 4/2014
(Continued)

OTHER PUBLICATIONS

3GPP: "Technical Specification Group Radio Access Network; Evolved Universal Terrestrial Radio Access (E-UTRA); Medium Access Control (MAC) Protocol Specification", 3GPP TS 36.321 V14.4.0, Sep. 25, 2017.
(Continued)

*Primary Examiner* — Timothy J Weidner
(74) *Attorney, Agent, or Firm* — Foley & Lardner LLP

(57) ABSTRACT

A beam detection method and apparatus addresses communication quality for downlink beam detection. The beam detection method comprises: a user equipment receiving beam quality monitoring signals sent by a network device by using M beams; determining signal quality indicators of M beam quality monitoring signals, and determining, based on the signal quality indicator of each of the M beam quality monitoring signals, a beam quality indicator of a beam used for sending a beam quality monitoring signal; generating a first detection report which comprises at least one of indication information of at least one beam, the beam quality indicator of which does not meet a first threshold, from among the M beams, the beam quality indicator of the at
(Continued)

least one beam, the beam quality indicator of which does not meet the first threshold, from among the M beams.

14 Claims, 5 Drawing Sheets

(51) Int. Cl.
    *H04W 16/28*     (2009.01)
    *H04W 24/10*     (2009.01)
    *H04W 72/04*     (2009.01)
    *H04W 84/02*     (2009.01)
    *H04W 88/02*     (2009.01)
    *H04W 88/08*     (2009.01)
    *H04W 92/02*     (2009.01)
    *H04W 92/10*     (2009.01)
    *H04W 72/044*     (2023.01)

(52) U.S. Cl.
    CPC ......... *H04W 16/28* (2013.01); *H04W 72/046* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
    CPC ........... H04W 24/02–10; H04W 36/0005–385; H04W 72/005–14; H04W 74/002–008; H04W 84/02–16; H04W 88/02–10; H04W 92/02; H04W 92/04; H04W 92/10
    See application file for complete search history.

(56) References Cited

U.S. PATENT DOCUMENTS

| | | | |
|---|---|---|---|
| 2014/0198681 A1* | 7/2014 | Jung | H04B 7/088 |
| 2019/0059013 A1* | 2/2019 | Rahman | H04B 7/0695 |
| 2019/0342871 A1* | 11/2019 | Tang | H04B 17/309 |
| 2021/0067222 A1* | 3/2021 | Yang | H04B 7/063 |

FOREIGN PATENT DOCUMENTS

| | | |
|---|---|---|
| CN | 104272843 A | 1/2015 |
| CN | 105556869 A | 5/2016 |
| CN | 106470062 A | 3/2017 |
| CN | 106879010 A | 6/2017 |
| CN | 107005859 A | 8/2017 |
| CN | 107211451 A | 9/2017 |
| EP | 3 176 966 A1 | 6/2017 |
| WO | WO 2010/048745 A1 | 5/2010 |

OTHER PUBLICATIONS

AT&T: "Beam Recovery for Full and Partial Control Channel Failure", 3GPP TSG RAN WG1 Meeting 90bis; RI-1718389; 3rd Generation Partnership Project (3GPP), Mobile Competence Centre; 650, Route Des Lucio Les; F-06921 Sophia-Antipolis Cede, vol. RAN WGl, no. Prague, Czech Republic; Oct. 9, 2017-Oct. 13, 2017, Oct. 8, 2017 (Oct. 8, 2017), XP051341571, Retrieved from the Internet: URL:http://www.3gpp.org/ftp/Meetings_3GPP_SYNC/RANI/Docs/ [retrieved on Oct. 8, 2017].

CMCC. "Beam Related Measurement Report and Inter-Cell HO in NR" 3GPP TSG-RAN WG2 Meeting #97, R2-1701921, Feb. 17, 2017.

Ericsson: "Open issues related to the contents of measurement report" 3GPP TSG RAN WG2 #99bis on NR; Tdoc R2-1710845; Oct. 9-13, 2017; Prague, Czech.

Vivo: "Beam management and beam reporting" 3GPP TSG RAN WG1 Meeting #90; R1-1712836; Aug. 21-25, 2017; Prague, P.R. Czech.

Vivo: "DL beam management and beam reporting" 3GPP TSG RAN WG1 Meeting #89; R1-1707244; May 15-19, 2017; Hangzhou, P.R. China.

ZTE Corporation: "Discussion on measurement report" 3GPP TSG RAN WG2#NR_AdHoc#2; R2-1706895; Jun. 29, 2017; Qingdao, China.

\* cited by examiner

BEAM DETECTION METHOD AND APPARATUS

The present application is a US National Stage of International Application No. PCT/CN2018/111069, filed Oct. 19, 2018, which claims priority to Chinese Patent Application No. 201711071524.X, filed with the Chinese Patent Office on Nov. 3, 2017 and entitled "Beam Detection Method and Apparatus", each of which is hereby incorporated by reference in its entirety.

FIELD

The application relates to the field of communications technologies, and particularly to a beam detection method and apparatus.

BACKGROUND

The beam-forming technology is a multi-antenna transmission technology, where the width of the beam and the direction of the beam can be adjusted flexibly by adjusting the weighting factor on each antenna unit, to realize the wireless signal transmission in a specific direction.

A network device may perform the beam-forming on a Physical Downlink Control CHannel (PDCCH) to obtain the spatial diversity gain of the multi-antenna array. One possible method for performing the beam-forming on the PDCCH is to divide the time/frequency resources available for the PDCCH transmission into multiple components, where each component is called a control resource set (CORESET). The network device may transmit a PDCCH signal carrying the Downlink Control Information (DCI) through a downlink beam on any CORESET, and the downlink beams used on different CORESETs are different. The user equipment may blindly detect the PDCCH signals on all the CORESETs. If the user equipment correctly decodes the PDCCH on one CORESET, the user equipment may obtain the DCI information on this PDCCH. If the channel quality of one CORESET or a group of CORESETs is poor, the PDCCH transmitted on the CORESET(s) will not be correctly decoded by the user equipment, but the user equipment may still correctly decode the PDCCHs transmitted on other CORESETs with sufficiently good signal quality.

When the high-frequency (e.g., millimeter wave frequency band) communication is used, the stronger path loss and frequency blocking may cause the poorer quality of the PDCCH signals transmitted by the network device through the downlink beams, so that the PDCCH signals transmitted through these downlink beams cannot be detected by the user equipment or cannot be parsed correctly by the user equipment.

In the prior art, a network device may transmit a beam quality monitoring signal to a user equipment through a downlink beam, and the user equipment detects the beam quality monitoring signal and evaluates the communication quality of the downlink beam according to the signal quality of the detected beam quality monitoring signal. When determining that the communication quality of each downlink beam is lower than the threshold, the user equipment reports the detection report indicating that all the downlink beams are unavailable to the network device.

However, the above method for detecting communication quality of the downlink beam provides less information to the network device, and it is difficult for the network device to improve the communication with the user equipment according to the detection report.

SUMMARY

The present application provides a beam detection method and apparatus, so as to solve the problem of lack of the good detection of the communication quality of the downlink beam in the prior art.

In a first aspect, the present application provides a beam detection method. The method includes: receiving, by a user equipment, beam quality monitoring signals transmitted by a network device using M beams, wherein the beam quality monitoring signals are signals used for monitoring beam quality and M is a positive integer; determining, by the user equipment, signal qualities of the M beam quality monitoring signals, and determining, based on the signal quality of each of the M beam quality monitoring signals, beam qualities of the beam used for transmitting the beam quality monitoring signals; generating, by the user equipment, a first detection report, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold; transmitting, by the user equipment, the first detection report to the network device.

In some optional implementations of the first aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams.

In some optional implementations of the first aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality satisfies the second threshold among the M2 second beams, and/or, the beam quality of at least one beam of which the beam quality satisfies the second threshold among the M2 second beams.

In some optional implementations of the first aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals;

the first detection report includes: indication information of at least one beam of which the beam quality does not satisfy the first threshold among the M1 first beams, and/or, the beam quality of at least one beam of which the beam quality does not satisfy the first threshold among the M1 first beams; and indication information of at least one beam of which the beam quality satisfies the second threshold among the M2 second beams, and/or, the beam quality of at least one beam of which the beam quality satisfies the second threshold among the M2 second beams.

In some optional implementations of the first aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams; after the user equipment determines beam quality parameters of the M beams, the method further includes: generating, by the user equipment, a second detection report, wherein the second detection report includes: indication information of at least one beam of which the beam quality satisfies the second threshold among the M2 second beams, and/or, the beam quality of at least one beam of which the beam quality satisfies the second threshold among the M2 second beams; transmitting, by the user equipment, the second detection report to the network device.

In some optional implementations of the first aspect, the M beams are first beams that have been determined to be available for communication with the user equipment, and beam quality monitoring signals transmitted through the M first beams are first beam quality monitoring signals; the first detection report specifically includes: indication information of at least one beam of which the beam quality does not satisfy the first threshold among the M first beams, and/or, the beam quality of at least one beam of which the beam quality does not satisfy the first threshold among the M first beams.

In some optional implementations of the first aspect, after the user equipment transmits the first detection report to the network device, the method further includes: receiving, by the user equipment, second beam quality monitoring signals transmitted by the network device using N second beams, wherein the second beams are beams that has not been determined to be used for communication with the user equipment and N is a positive integer; determining, by the user equipment, signal qualities of the N second beam quality monitoring signals, and determining, based on the signal quality of each of the N second beam quality monitoring signals, beam qualities of the second beams used for transmitting the second beam quality monitoring signals; generating, by the user equipment, a second detection report including: indication information of at least one beam of which the beam quality satisfies the second threshold among the N second beams, and/or, the beam quality of at least one beam of which the beam quality satisfies the second threshold; transmitting, by the user equipment, the second detection report to the network device.

In some optional implementations of the first aspect, the first detection report specifically includes: indication information of all of L1 beams of which beam qualities do not satisfy the first threshold among the first beams, and/or, beam qualities of K1 beams with the best or worst beam qualities among the L1 beams, wherein K1 is 1, or K is smaller one of L1 and H, and H is a maximum number of beam qualities carried by uplink resources used by the user equipment to transmit the first detection report.

In some optional implementations of the first aspect, the first detection report specifically includes: indication information of K2 beams with the best or worst beam qualities among beams of which beam qualities do not satisfy the first threshold among the first beams, and/or, the beam quality of at least one of the K2 beams.

In some optional implementations of the first aspect, the first detection report specifically includes: indication information of all of L2 beams of which beam qualities satisfy the second threshold among the second beams, and/or, beam qualities of K3 beams with the best or worst beam qualities among the L2 beams, wherein K3 is 1, or K3 is smaller one of L2 and H, and H is a maximum number of beam qualities carried by uplink resources used by the user equipment to transmit the first detection report.

In some optional implementations of the first aspect, the first detection report specifically includes: indication information of K4 beams with the best or worst beam qualities among beams of which beam qualities satisfy the second threshold among the second beams, and/or, the beam quality of at least one of the K4 beams.

In some optional implementations of the first aspect, the first detection report specifically includes: indication information of K2 beams with the best or worst beam qualities among beams of which beam qualities do not satisfy the first threshold among the first beams, and/or, the beam quality of at least one of the K2 beams; and indication information of K4 beams with the best or worst beam qualities among beams of which beam qualities satisfy the second threshold among the second beams, and/or, the beam quality of at least one of the K4 beams; wherein K2 is less than or equal to the total number of beams of which beam qualities do not satisfy the first threshold among the first beams, and K4 is less than or equal to the total number of beams of which beam qualities satisfy the second threshold among the second beams.

In some optional implementations of the first aspect, the second detection report specifically includes: indication information of all of L2 beams of which beam qualities satisfy the second threshold among the second beams, and/or, beam qualities of K3 beams with the best or worst beam qualities among the L2 beams, wherein K3 is 1, or K3 is smaller one of L2 and H, and H is a maximum number of beam qualities carried by uplink resources used by the user equipment to transmit the first detection report.

In some optional implementations of the first aspect, the second detection report specifically includes: indication information of K4 beams with the best or worst beam qualities among beams of which beam qualities satisfy the second threshold among the second beams, and/or, the beam quality of at least one of the K4 beams.

In some optional implementations of the first aspect, determining, by the user equipment, the beam quality of the beam, includes: taking the signal quality of the beam quality monitoring signal transmitted through the beam as the beam quality of the beam; or determining a hypothetical communication quality of a resource set corresponding to the beam based on the signal quality of the beam quality monitoring signal transmitted through the beam, and taking the hypothetical communication quality of the resource set corresponding to the beam as the beam quality of the beam; or determining a hypothetical communication quality of a downlink channel corresponding to the beam based on the signal quality of the beam quality monitoring signal transmitted through the beam, and taking the hypothetical communication quality of the downlink channel corresponding to the beam as the beam quality of the beam; or determining a hypothetical communication quality of a search space corresponding to the beam based on the signal quality of the beam quality monitoring signal transmitted through the beam, and taking the hypothetical communication quality of the search space corresponding to the beam as the beam quality of the beam.

In some optional implementations of the first aspect, when the first detection report includes indication information of at least two first beams, the indication information of the at least two first beams is sorted according to beam qualities of beams; and/or, when the first detection report includes beam qualities of at least two first beams, the beam qualities of the at least two first beams are sorted according to beam qualities of beams.

In some optional implementations of the first aspect, when the first detection report includes indication information of at least two second beams, the indication information of the at least two second beams is sorted according to beam qualities of beams; and/or, when the first detection report includes beam qualities of at least two second beams, the beam qualities of the at least two second beams are sorted according to beam qualities of beams.

In some optional implementations of the first aspect, the first detection report further includes padding bits or reserved bits.

In some optional implementations of the first aspect, the padding bits include: beam qualities of K5 beams with worst beam qualities among beams satisfying the first threshold, and/or, beam qualities of K6 beams with worst beam qualities among beams not satisfying the second threshold.

In some optional implementations of the first aspect, the first detection report further includes: indication information indicating the quantity of indication information of the at least one beam of which the beam quality does not satisfy the first threshold in the first detection report; and/or indication information indicating the quantity of the beam quality of the at least one beam of which the beam quality does not satisfy the first threshold in the first detection report; and/or indication information indicating the quantity of indication information of the at least one beam of which the beam quality satisfies the second threshold in the first detection report; and/or indication information indicating the quantity of the beam quality of the at least one beam of which the beam quality satisfies the second threshold in the first detection report; and/or indication information indicating a position of the indication information of the at least one beam of which the beam quality does not satisfy the first threshold in the first detection report; and/or indication information indicating a position of the beam quality of the at least one beam of which the beam quality does not satisfy the first threshold in the first detection report; and/or indication information indicating a position of indication information of the at least one beam of which the beam quality satisfies the second threshold in the first detection report; and/or indication information indicating a position of the beam quality of the at least one beam of which the beam quality satisfiesy the second threshold in the first detection report; and/or information indicating the type of the first detection report, wherein the type of the first detection report includes: a detection report of beams not satisfying the first threshold, a detection report of beams satisfying the second threshold, and a detection report of beams not satisfying the first threshold and beams satisfying the second threshold; and/or information indicating the maximum amount of beam indication information allowed to be contained in the first detection report; and/or information indicating the maximum number of beam qualities allowed to be contained in the first detection report.

In some optional implementations of the first aspect, the quantity of indication information of the at least one beam of which the beam quality does not satisfy the first threshold in the first detection report is a first quantity agreed with the network device; and/or the quantity of the beam quality of the at least one beam of which the beam quality does not satisfy the first threshold in the first detection report is a second quantity agreed with the network device; and/or the quantity of indication information of the at least one beam of which the beam quality satisfies the second threshold in the first detection report is a third quantity agreed with the network device; and/or the quantity of the beam quality of the at least one beam of which the beam quality satisfies the second threshold in the first detection report is a fourth quantity agreed with the network device.

In some optional implementations of the first aspect, transmitting, by the user equipment, the first detection report to the network device, includes: when transmitting of the first detection report by the user equipment on first uplink resource for transmitting the first detection report collides with transmitting of a third signal to the network device on second uplink resource, then: cancelling, by the user equipment, the transmitting of the third signal on the second uplink resource, and transmitting the first detection report on the first resource; or cancelling, by the user equipment, the transmitting of the third signal on the second uplink resource, and transmitting the first detection report and the third signal on the first resource; or cancelling, by the user equipment, the transmitting of the first detection report on the first uplink resource, and transmitting the first detection report on the second resource; or cancelling, by the user equipment, the transmitting of the first detection report on the first uplink resource, and transmitting the first detection report and the third signal on the second resource.

In some optional implementations of the first aspect, the user equipment receives configuration information transmitted by the network device before receiving the beam quality monitoring signals transmitted by the network device, wherein the configuration information is used for indicating the user equipment to receive the beam quality monitoring signals according to indicated configuration parameters.

In some optional implementations of the first aspect, the user equipment further receives second configuration information transmitted by the network device before generating the first detection report, wherein the second configuration information includes: indication information indicating the quantity of indication information of the at least one of which the beam quality does not satisfy the first threshold in the first detection report; and/or indication information indicating the quantity of the beam quality of the at least one beam of which the beam quality does not satisfy the first threshold in the first detection report; and/or indication information indicating the quantity of indication information of the at least one beam of which the beam quality satisfies the second threshold in the first detection report; and/or indication information indicating the quantity of the beam quality of at least one beam of which the beam quality satisfies the second threshold included in the first detection report; and/or indication information indicating a position of indication information of beams of which beam qualities do not satisfy the first threshold in the first detection report; and/or indication information indicating a position of the beam quality of the at least one beam of which the beam quality does not satisfy the first threshold in the first detection report; and/or indication information indicating a position of indication information of the at least one beam of which the beam quality satisfies the second threshold in the first detection report; and/or indication information indicating a position of the beam quality of the at least one beam of which the beam quality satisfies the second threshold in the first detection report; and/or information indicating the type of the first detection report, wherein the type of the first detection report includes: a detection report of beams not satisfying the first threshold, a detection report of beams satisfying the second threshold, and a detection report of beams not satisfying the first threshold and beams satisfying the second threshold; and/or information indicating the maximum amount of beam indication information allowed to be contained in the first detection report; and/or information indicating the maximum number of beam qualities allowed to be contained in the first detection report.

In a second aspect, the present application provides a beam detection method, including: transmitting, by a network device, beam quality monitoring signals using M beams, wherein the beam quality monitoring signals are signals used for monitoring beam quality and M is a positive integer; receiving, by the network device, a first detection report transmitted by a user equipment, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold.

In some optional implementations of the second aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams; after the network device receives the first detection report, the method further includes: deleting, by the network device, at least one beam of which the beam quality does not satisfy the first threshold from the first beams.

In some optional implementations of the second aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality satisfies the second threshold among the M2 second beams, and/or, the beam quality of at least one beam of which the beam quality satisfies the second threshold among the M2 second beams; after the network device receives the first detection report, the method further includes: adding, by the network device, at least one second beam of which the beam quality satisfies the second threshold to the first beams.

In some optional implementations of the second aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams; and indication information of at least one beam of which the beam quality satisfies the second threshold among the M2 second beams, and/or, the beam quality of at least one beam of which the beam quality satisfies the second threshold among the M2 second beams; after the network device receives the first detection report, the method further includes: deleting, by the network device, at least one beam of which the beam quality does not satisfy the first threshold from the first beams, and/or, adding at least one second beam of which the beam quality satisfies the second threshold to the first beams.

In some optional implementations of the second aspect, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams; the method further includes: receiving, by the network device, a second detection report transmitted by the user equipment, wherein the second detection report includes: indication information of at least one beam of which the beam quality satisfies the second threshold among the M2 second beams, and/or, the beam quality of at least one beam of which the beam quality satisfies the second threshold among the M2 second beams; deleting, by the network device, at least one beam of which the beam quality does not satisfy the first threshold from the first beams, and/or, adding at least one second beam of which the beam quality satisfies the second threshold to the first beams.

In some optional implementations of the second aspect, the M beams are first beams that have been determined to be available for communication with the user equipment, and beam quality monitoring signals transmitted through the M first beams are first beam quality monitoring signals; the first detection report specifically includes: indication information of at least one beam of which the beam quality does not satisfy the first threshold among the M first beams, and/or, the beam quality of at least one beam of which the beam quality does not satisfy the first threshold among the M first beams; after the network device receives the first detection report, the method further includes: transmitting, by the network device, second beam quality monitoring signals to the user equipment using N second beams, wherein the second beams are beams that has not been determined to be used for communication with the user equipment and N is a positive integer; receiving, by the network device, a second detection report reported by the user equipment, wherein the second detection report includes: indication information of at least one beam of which the beam quality satisfies the second threshold among the N second beams, and/or, the beam quality of at least one beam of which the beam quality satisfies the second threshold; deleting, by the network device, at least one beam of which the beam quality does not satisfy the first threshold from the first beams, and/or, adding at least one second beam of which the beam quality satisfies the second threshold to the first beams.

In some optional implementations of the second aspect, the network device further transmits configuration information to the user equipment before transmitting the beam quality monitoring signals to the user equipment, wherein the configuration information is used for indicating the user equipment to receive the beam quality monitoring signals according to indicated configuration parameters.

In some optional implementations of the second aspect, the network device further transmits second configuration information to the user equipment, wherein the second configuration information includes: indication information indicating the type of the first detection report reported by the user equipment; and/or indication information indicating the quantity of indication information of the at least one beam of which the beam quality does not satisfy the first threshold in the first detection report; and/or indication information indicating the quantity of the beam quality of the at least one beam of which the beam quality does not satisfy the first threshold in the first detection report; and/or indication information indicating the quantity of indication information of the at least one beam of which the beam quality satisfies the second threshold in the first detection report; and/or indication information indicating the quantity of the beam quality of the at least one beam of which the beam quality satisfies the second threshold in the first detection report; and/or indication information indicating a position of indication information of the at least one beam of which the beam quality does not satisfy the first threshold in the first detection report; and/or indication information indicating a position of the beam quality of the at least one beam of which the beam quality does not satisfy the first threshold in the first detection report; and/or indication information indicating a position of indication information of the at least one beam of which the beam quality satisfies the second threshold in the first detection report; and/or indication information indicating a position of the beam quality of the at least one beam of which the beam quality satisfies the second threshold in the first detection report; and/or information indicating the maximum amount of beam indication information allowed to be contained in the first detection report; and/or information indicating the maximum number of beam qualities allowed to be contained in the first detection report.

In some optional implementations of the second aspect, receiving, by the network device, the first detection report transmitted by the user equipment, includes: when transmitting of the first detection report by the user equipment on first uplink resource for transmitting the first detection report collides with transmitting of a third signal to the network device on second uplink resource, then: cancelling, by the network device, reception of the third signal transmitted on the second uplink resource, and receiving the first detection report transmitted on the first resource; or cancelling, by the network device, reception of the third signal transmitted on the second uplink resource, and receiving the first detection report and the third signal transmitted on the first resource; or cancelling, by the network device, reception of the first detection report transmitted on the first uplink resource, and receiving the first detection report transmitted on the second resource; or cancelling, by the network device, reception of the first detection report transmitted on the first uplink resource, and receiving the first detection report and the third signal transmitted on the second resource.

In some optional implementations of the second aspect, the network device blindly detects the first detection report according to a blind detection rule after receiving the first detection report transmitted by the user equipment.

In a third aspect, the present application provides a beam detection apparatus which is configured to perform the method in the first aspect or in any possible implementation of the first aspect described above. Specifically, this apparatus includes modules for performing the method in the first aspect or in any possible implementation of the first aspect described above.

Optionally, the apparatus includes: a receiving module configured to receive beam quality monitoring signals transmitted by a network device using M beams, wherein the beam quality monitoring signals are signals used for monitoring beam quality and M is a positive integer; a processing module configured to determine signal qualities of the M beam quality monitoring signals, determine, based on the signal quality of each of the M beam quality monitoring signals, beam qualities of the beams used for transmitting the beam quality monitoring signals, and generate a first detection report, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold; a transmitting module configured to transmit the first detection report to the network device.

In a fourth aspect, the present application provides a beam detection apparatus which is configured to perform the method in the second aspect or in any possible implementation of the second aspect described above. Specifically, this apparatus includes modules for performing the method in the second aspect or in any possible implementation of the second aspect described above.

Optionally, the apparatus includes: a transmitting module configured to transmit beam quality monitoring signals using M beams, wherein the beam quality monitoring signals are signals used for monitoring beam quality and M is a positive integer; a receiving module configured to receive a first detection report transmitted by a user equipment, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold.

In a fifth aspect, the present application provides a user equipment which is configured to perform the method in the first aspect or in any possible implementation of the first aspect described above. Specifically, this user equipment includes modules for performing the method in the first aspect or in any possible implementation of the first aspect described above.

Optionally, the user equipment includes: a memory configured to store computer instructions; a communication interface configured to communicate with a network device; a processor connected communicatively to the memory and the communication interface respectively and configured to execute the computer instructions to perform the method in the first aspect or in any possible implementation of the first aspect described above.

In a sixth aspect, the present application provides a network device which is configured to perform the method in the second aspect or in any possible implementation of the second aspect described above. Specifically, this network device includes modules for performing the method in the second aspect or in any possible implementation of the second aspect described above.

Optionally, the network device includes: a memory configured to store computer instructions; a communication interface configured to communicate with a network device; a processor connected communicatively to the memory and the communication interface respectively and configured to execute the computer instructions to perform the method in the second aspect or in any possible implementation of the second aspect described above when executing the computer instructions.

In a seventh aspect, the present application provides a computer readable storage medium storing the computer instructions therein, where the computer instructions cause a computer to perform the method in the first or second aspect or in any possible implementation of the first or second aspect when running on the computer.

In an eighth aspect, the present application provides a computer program product which causes a computer to perform the method in the first or second aspect or in any possible implementation of the first or second aspect when running on the computer.

One or more technical solutions provided in the embodiments of the present application have at least the following technical effects or advantages.

The user equipment may report a variety of information to the network device, for example, the indication information of at least one beam of which the beam quality does not satisfy the first threshold among the M beams, the beam quality of at least one beam of which the beam quality does not satisfy the first threshold, the indication information of at least one beam of which the beam quality satisfies the second threshold, the beam quality of at least one beam of which the beam quality satisfies the second threshold and the like. The network device may determine the beams that can be used when communicating with the user equipment based on one or more kinds of information described above. Compared with the prior art where the user equipment reports a report indicating that the downlink beams are unavailable to the network device only when all the downlink beams do not meet the requirements, the ability of the network device to improve the quality of the communication with the user equipment is enhanced.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION

Figure 1:
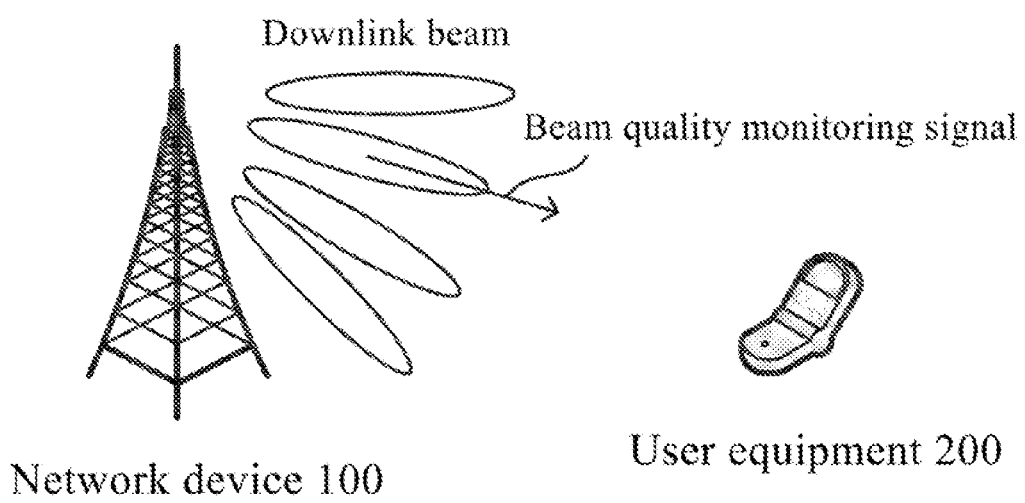
FIG. 1 is a schematic diagram of a communication system according to an embodiment of the present application.

In order to make the objects, technical solutions and advantages of the present application clearer, the present application will be further described below in details with reference to the accompanying drawings.

The present application provides a beam detection method and apparatus, so as to solve the problem of lack of the good detection of the communication quality of the downlink beam in the prior art. Here, the method and the apparatus are based on the same inventive concept. Since the principle of solving the problem in the method is similar to that in the apparatus, the implementations of the method and the apparatus may refer to each other, and the repeated description thereof will be omitted.

The "multiple" involved in the present application means two or more. Furthermore, the word such as "first" or "second" in the description of the present application is only for purpose of distinguishing the description, and cannot be construed to indicate or imply the relative importance and cannot be construed to indicate or imply the order either.

The term "and/or" in the present application is simply an association relationship describing the associated objects, indicating that there may be three relationships, for example, A and/or B may represent: only A, both A and B, and only B. Furthermore, the character "/" herein generally represents that the associated objects have a kind of "or" relationship.

The technical solutions provided by the embodiments of the present application may be applicable to the 5th-Generation (5G) mobile communication system, and may also be applicable to other wireless communication systems, e.g., Long Term Evolution (LTE) system, Global System for Mobile Communication (GSM), Universal Mobile Telecommunications System (UMTS), Code Division Multiple Acces (CDMA) system, new network device systems and the like.

The network device in the present application may be a base station, which may be a gNode B (gNB) in the 5G communication, or may be an evolutional Node B (eNB or e-NodeB) in the LTE, or may be a Base Transceiver Station (BTS) in the GSM or CDMA, or may be a NodeB in the Wideband CDMA (WCDMA). The embodiments of the invention are described below by taking a base station as an example.

The user equipment may refer to the device for providing the voice and/or data connectivity to the user, the handheld device with the wireless connection function, or other processing device connected to the wireless modem. The wireless user equipment can communicate with one or more core networks via the Radio Access Network (RAN), and the wireless user equipment can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless user equipment can also be called system, Subscriber Unit, Subscriber Station, Mobile Station, Mobile Station, Remote Station, Access Point, Remote Terminal, Access Terminal, User Terminal, User Agent, User Equipment (UE).

It should be understood that the beam formed by the beam-forming technology in the embodiments of the present application may be a digital beam or an analog beam, which is not limited in the embodiments of the present application.

It should be understood that the network device in the embodiments of the present application may transmit a data signal to the user equipment through a beam (also referred to as downlink beam), and may also transmit a control signal to the user equipment through the downlink beam, for example, the network device transmits the Downlink Control Information (DCI) to the user equipment on the Physical Downlink Control CHannel (PDCCH) through the downlink beam.

For the purpose of brief introduction, the embodiments of the present application are described by taking the case that a network device transmits the DCI to a user equipment through a downlink beam as an example, but this should not constitute any limitation on the embodiments of the present application.

FIG. 1 is a schematic diagram of a communication system according to an embodiment of the present application. The system includes a network device 100 and a user equipment 200, wherein the network device includes a plurality of transmitting antennas, can form a plurality of downlink beams by using the beam-forming technology, and transmits control signals and/or data signals to the user equipment 200 through the downlink beams. The user equipment 200 may also transmit the uplink information, such as a detection report, to the network device 100. It should be noted that the user equipment 200 may also transmit the information to the network device by using the uplink beams formed through the beam-forming technology, but the embodiments of the present application do not limit this.

In the embodiments of the present application, the downlink beams of the network device include "first beams" and "second beams", where the so-called first beam refers to a beam that has been determined to be available for communication with the user equipment. When the network device needs to transmit a signal to the user equipment, the network device may select any first beam to transmit the signal. The so-called second beam refers to a beam that has not been determined to be used for communication with the user equipment. It should be understood that the second beam has the ability to transmit signals to the user equipment, but the network device does not select the second beam as the beam transmitting the data or signaling to the user equipment. In the embodiments of the present application, the network device may transmit a beam quality monitoring signal to the user equipment by using a second beam, and the function thereof may be to detect the beam quality of the second beam.

Figure 2:
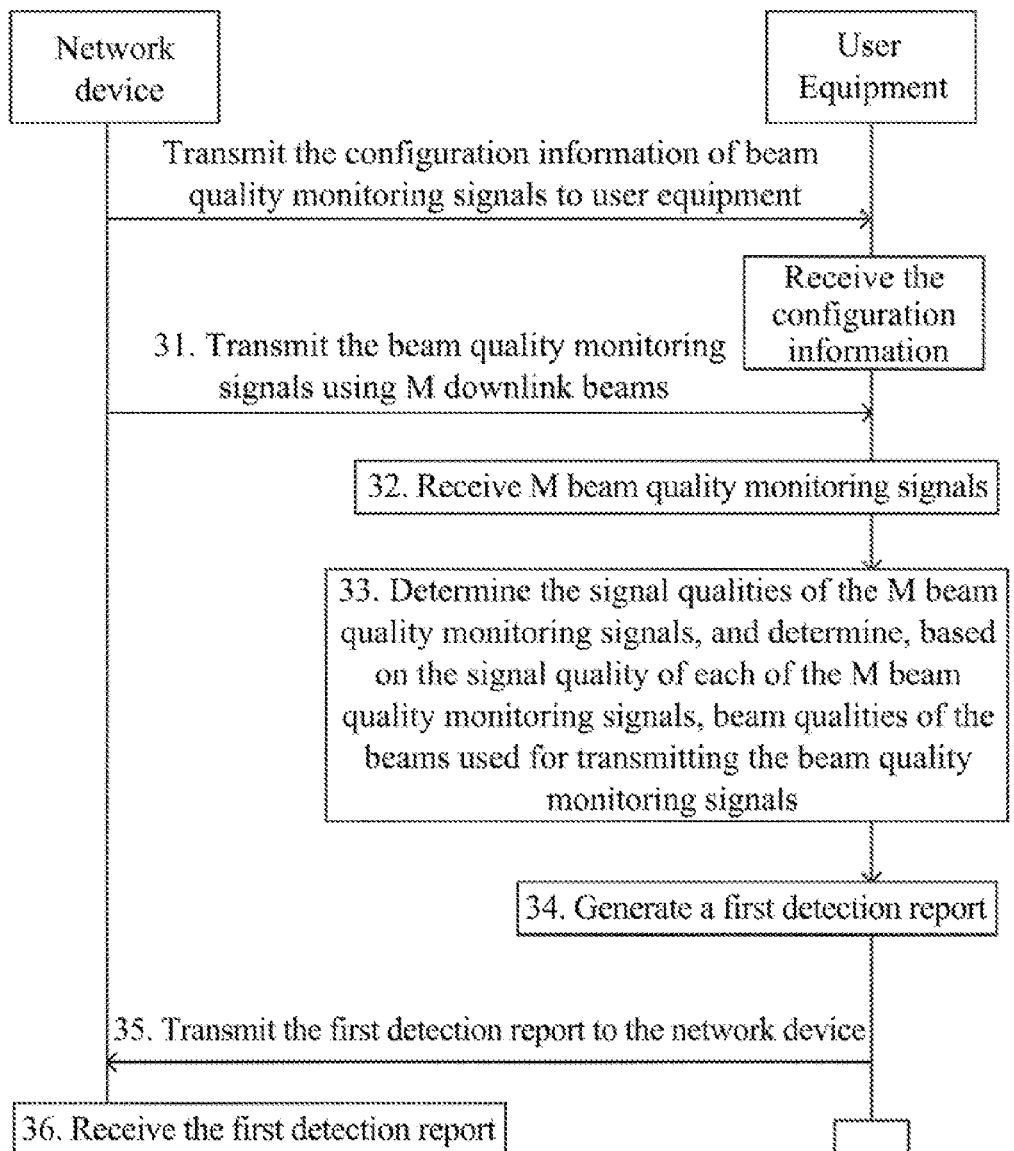
FIG. 2 is a flow schematic diagram of a beam detection method according to an embodiment of the present application.

FIG. 2 is a schematic diagram of a method for detecting the beam communication quality according to an embodiment of the present application. The method includes the following steps.

Step 31: the network device transmits beam quality monitoring signals using M downlink beams, where M is a positive integer.

The beam quality monitoring signal is a reference signal for monitoring the beam quality, and may be implemented in various ways, e.g., Synchronization Signal (SS) or Channel State Information Reference Signal (CSI-RS) or the like. Each beam quality monitoring signal may have a certain signal identifier which is the information that can distinguish the beam quality monitoring signal from other beam quality monitoring signals. For example, the sequence used by the beam quality monitoring signal may be used as the signal identifier, or the cyclic shift generating the sequence of the beam quality monitoring signal is used as the signal identifier, or the signal identifier is the index of the beam quality monitoring signal. The user equipment may detect the beam quality monitoring signal by using different hypothetical sequences. When a certain signal quality is satisfied, it is considered that there is a detected beam quality monitoring signal and the identifier thereof is determined. The user equipment may also detect the beam quality monitoring signal by using different hypothetical cyclic shifts. When a certain signal quality is satisfied, it is considered that there is a detected beam quality monitoring signal and the identifier thereof is determined. The identifier of the beam quality monitoring signal may also be configured by the network device for the user equipment. The network device transmits the configuration information to the user equipment, and the user equipment receives the configuration information and obtains the identifier of the beam quality monitoring signal.

Step 32: the user equipment receives M beam quality monitoring signals.

In a possible variation, there are beams with poor communication quality among M downlink beams of the network device, and the user equipment cannot detect the beam quality monitoring signals transmitted through these downlink beams, so the user equipment can only receive S beam quality monitoring signals among the M beam quality monitoring signals. In order to simplify the description, such variation will not be described in details in the following description of the embodiments of the present application, but those ordinary skilled in the art should understand that the solution of the embodiments of the present application is also applicable to this variation and the present application intends to protect this variation.

Step 33: the user equipment determines the signal qualities of the M beam quality monitoring signals, and determines, based on the signal quality of each of the M beam quality monitoring signals, the beam qualities of the beams used for transmitting the beam quality monitoring signals.

The signal quality of the beam quality monitoring signal may be implemented in various ways, for example, the signal quality may be any one of parameters such as Block Error Ratio (BLER), Reference Signal Receiving Power (RSRP), Signal-Noise Ratio (SNR) and Channel Quality Indicator (CQI). The signal quality may also include two or more of the above parameters.

The beam quality of the beam may be implemented in various ways, including but not limited to the followings.

(1) The user equipment takes the signal quality of the beam quality monitoring signal transmitted through the beam as the beam quality of the beam.

(2) The user equipment determines the hypothetical communication quality of a resource set corresponding to the beam based on the signal quality of the beam quality monitoring signal transmitted through the beam, and takes the hypothetical communication quality of the resource set corresponding to the beam as the beam quality of the beam.

The so-called resource set refers to a combination of time-domain resource and frequency-domain resource, for example, CORESET is a resource set. In an embodiment of the present application, each downlink beam may correspond to one or more resource sets, and there is a mapping relationship between the desired value of the communication quality of the resource set and the signal quality of the beam quality monitoring signal transmitted through the beam corresponding to the resource set. Therefore, the user equipment may determine the desired value of the communication quality (which may also be called hypothetical communication quality) of the resource set corresponding to the beam according to the signal quality of the beam quality monitoring signal transmitted over the beam. The above-mentioned mapping relationship between the desired value of the communication quality of the resource set and the signal quality of the beam quality monitoring signal may be implemented in various ways, which will not be described in details in the embodiments of the present application. Those ordinary skilled in the art may know the various implementations from the prior art.

The beam corresponds to the resource set, which means that there is a correspondence between the beam and the resource set. For example, the correspondence may means that a resource set corresponding to a beam is the resource set that can use the beam to transmit signals.

In an embodiment of the present application, the resource set corresponding to the beam may also be a hypothetical resource set, i.e., a resource set using the beam that is hypothetical to exist.

(3) The user equipment determines the hypothetical communication quality of a downlink channel corresponding to the beam based on the signal quality of the beam quality monitoring signal transmitted through the beam, and takes the hypothetical communication quality of the downlink channel corresponding to the beam as the beam quality of the beam. The downlink channel may be a PDCCH channel, or a PDSCH (Physical Downlink Share Channel), or another downlink channel, which is not limited herein.

(4) The user equipment determines the hypothetical communication quality of a search space corresponding to the beam based on the signal quality of the beam quality monitoring signal transmitted through the beam, and takes the hypothetical communication quality of the search space corresponding to the beam as the beam quality of the beam.

The implementations of (3) and (4) above are similar to the implementation of (2), please refer to the description of the implementation of (2).

For ease of description, the signal quality of the beam quality monitoring signal is taken as the beam quality of the beam in the following content of the embodiments of the present application.

Step 34: the user equipment generates a first detection report, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold.

The so-called first threshold is a threshold value for measuring the communication quality of the beam, and the beam quality of the beam satisfying the first threshold indicates that the communication quality of the beam can meet the communication requirement. Conversely, when the beam quality of the beam does not satisfy the first threshold, it indicates that the communication quality of the beam does not meet the communication requirement.

The specific implementation of the first threshold may correspond to the beam quality. For example, when the beam quality is the BLER of the beam quality monitoring signal, the beam quality of the beam satisfies the first threshold value if the BLER of the beam quality monitoring signal is less than or equal to the threshold a1, and conversely, the beam quality of the beam does not satisfy the first threshold value if the BLER of the beam quality monitoring signal is greater than the threshold a1. As another example, when the beam quality is the RSRP of the beam quality monitoring signal, the beam quality of the beam satisfies the first threshold value if the RSRP of the beam quality monitoring signal is greater than or equal to the threshold b1, and conversely, the beam quality of the beam does not satisfy the first threshold value if the RSRP of the beam quality monitoring signal is less than the threshold b1. Therefore, the beam quality satisfying the first threshold does not mean that the value of the beam quality is greater than the value of the first threshold, but means that the beam communication quality represented by the beam quality is higher than or equal to the beam communication quality represented by the first threshold.

Those ordinary skilled in the art should understand that the implementation of the second threshold is similar to the first threshold, and the requirement of the second threshold on the signal quality may be equal to or higher than the first threshold. The first and second thresholds may be the requirements on the communication quality of different types of downlink beams. For example, the first threshold is the requirement on the communication quality of the first beam, and the second threshold is the requirement on the communication quality of the second beam. Therefore, the beams of which the signal qualities do not satisfy the first threshold may be selected from the first beams, and the beams of which the signal qualities satisfy the second threshold may be selected from the second beams. This is not limited by the embodiments of the present application.

The indication information of the beam may be implemented in various ways, e.g., the identifier or the index of the beam, the identifier or the index of the beam quality monitoring signal transmitted through the beam, the identifier or the index of the resource set configured for the beam, the identifier or index of the downlink channel configured for the beam, the identifier or index of the search space of the beam, or the like. In addition, the indication information of the beam may also be implemented in an implicit manner, for example, the first detection report includes an M-bit bitmap, where the value of the bit corresponding to the target beam in the M-bit bitmap is 1, and the values of the remaining bits are 0 (or conversely, the value of the bit of the target beam is 0, and the values of the remaining bits are 1). As another example, the indication information of the beam is implicitly carried by different sequences or different cyclic shifts of a Physical Random Access CHannel (PRACH). Those skilled in the art may also determine other implementations of the beam indication information according to the prior art.

Step 35: the user equipment transmits the first detection report to the network device.

Step 36: the network device receives the first detection report. After receiving the first detection report, the network device may determine the beam(s) that can be used when communicating with the user equipment according to the first detection report.

In the above technical solution, the user equipment may report a variety of information to the network device, for example, the indication information of at least one beam of which the beam quality does not satisfy the first threshold among the M beams, the beam quality of at least one beam of which the beam quality does not satisfy the first threshold, the indication information of at least one beam of which the beam quality satisfies the second threshold, the beam quality of at least one beam of which the beam quality satisfies the second threshold and the like. The network device may determine the beams that can be used when communicating with the user equipment based on one or more kinds of information described above. Compared with the prior art where the user equipment reports a report indicating that the downlink beams are unavailable to the network equipment only when all the downlink beams do not meet the requirements, the ability of the network equipment to improve the quality of the communication with the user equipment is enhanced.

Multiple possible implementations of the first detection report are introduced below.

In a first implementation, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality does not satisfy the first threshold among the M1 first beams, and/or, the beam quality of at least one beam of which the beam quality does not satisfy the first threshold among the M1 first beams.

If the first detection report includes the indication information of at least one beam of which the beam quality does not satisfy the first threshold among the M1 first beams and the beam quality of at least one beam of which the beam quality does not satisfy the first threshold among the M1 first beams, the number of beams corresponding to the indication information of the beams of which the beam qualities do not satisfy the first threshold may be the same as or different from the number of the beam qualities of the beams of which the beam qualities do not satisfy the first threshold. For example, the first detection report includes the indication information of X1 beams of which the beam qualities do not satisfy the first threshold among the M1 first beams and the beam qualities of X2 beams of which the beam qualities do not satisfy the first threshold among the M1 first beams, where X1>X2 or X1=X2.

For the first detection report described above, the network device may delete, from the first beams maintained by the network device, one or more beams of which the beam qualities do not satisfy the first threshold in the first detection report, to thereby avoid the information loss and damage or the longer time taken by the user equipment to receive the information or other bad results when transmitting the information to the user equipment through these beams.

For the first detection report described above, the network device may delete, from the M1 first beams, one or more beams of which the beam qualities do not satisfy the first threshold in the first detection report, to thereby avoid the information loss and damage or the longer time taken by the user equipment to receive the information or other bad results when transmitting the information to the user equipment through these beams.

For the first detection report described above, the network device may not update the beams contained in the first beams temporarily, and update the beams contained in the first beams after meeting a certain condition. For example, the beams contained in the first beams are updated after the user equipment reports the first detection report a certain number of times.

In a second implementation, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality satisfies the second threshold among the M2 second beams, and/or, the beam quality of at least one beam of which the beam quality satisfies the second threshold among the M2 second beams.

If the first detection report includes the indication information of at least one beam of which the beam quality satisfies the second threshold among the M2 second beams and the beam quality of at least one beam of which the beam quality satisfies the second threshold among the M2 second beams, the number of beams corresponding to the indication information of the beams of which the beam qualities satisfy the second threshold may be the same as or different from the number of the beam qualities of the beams of which the beam qualities satisfy the second threshold. For example, the first detection report includes the indication information of Y1 beams of which the beam qualities satisfy the second threshold among the M2 second beams and the beam qualities of Y2 beams of which the beam qualities satisfy the second threshold among the M2 second beams, where Y1>Y2 or Y1=Y2.

For the first detection report described above, the network device may add one or more beams of which the beam qualities satisfy the second threshold contained in the first detection report among the second beams maintained by the network device to the first beams, to increase the beams available when communicating with the user equipment and enhance the ability of the network device to communicate with the user equipment. Optionally, the network device may delete, from the second beams, the one or more beams of which the beam qualities satisfy the second threshold contained in the first detection report and that have been added to the first beams.

In a third implementation, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes:

indication information of at least one beam of which the beam quality does not satisfy the first threshold among the M1 first beams, and/or, the beam quality of at least one beam of which the beam quality does not satisfy the first threshold among the M1 first beams;

and, indication information of at least one beam of which the beam quality satisfies the second threshold among the M2 second beams, and/or, the beam quality of at least one beam of which the beam quality satisfies the second threshold among the M2 second beams.

The indication information of at least one beam of which the beam quality does not satisfy the first threshold among the M1 first beams, and/or, the beam quality of at least one beam of which the beam quality does not satisfy the first threshold among the M1 first beams described above may refer to the first implementation.

The indication information of at least one beam of which the beam quality satisfies the second threshold among the M2 second beams, and/or, the beam quality of at least one beam of which the beam quality satisfies the second threshold among the M2 second beams described above may refer to the second implementation.

For the first detection report described above, the network device may delete, from the M1 first beams, at least one beam of which the beam quality does not satisfy the first threshold, to thereby avoid the information loss and damage or the longer time taken by the user equipment to receive the information or other bad results when transmitting the information to the user equipment through these beams. And, the network device may add, to the first beams, at least one beam of which the beam quality satisfies the second threshold among the M2 second beams, to increase the beams available when communicating with the user equipment and enhance the ability of the network device to communicate with the user equipment.

In a fourth implementation, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality does not satisfy the first threshold among the M1 first beams, and/or, the beam quality of at least one beam of which the beam quality does not satisfy the first threshold among the M1 first beams.

After the user equipment determines beam quality parameters of the M beams, the method further includes: the user equipment generates a second detection report, which includes: indication information of at least one beam of which the beam quality satisfies the second threshold among the M2 second beams, and/or, the beam quality of at least one beam of which the beam quality satisfies the second threshold among the M2 second beams; the user equipment transmits the second detection report to the network device.

The indication information of at least one beam of which the beam quality does not satisfy the first threshold among the M1 first beams, and/or, the beam quality of at least one beam of which the beam quality does not satisfy the first threshold among the M1 first beams described above may refer to the first implementation.

The indication information of at least one beam of which the beam quality satisfies the second threshold among the M2 second beams, and/or, the beam quality of at least one beam of which the beam quality satisfies the second threshold among the M2 second beams described above may refer to the second implementation.

In the above fourth implementation, the user equipment transmits the detection result of the first beams (included in the first detection report) and the detection result of the second beams (included in the second detection report) to the network device respectively, which can simplify the difficulty for network equipment to identify the detection results and improve the efficiency of the beam detection.

For the first detection report described above, the network device may delete, from the M1 first beams, at least one beam of which the beam quality does not satisfy the first threshold, to thereby avoid the information loss and damage or the longer time taken by the user equipment to receive the information or other bad results when transmitting the information to the user equipment through these beams. And, for the second detection report described above, the network device may add, to the first beams, at least one beam of which the beam quality satisfies the second threshold among the M2 second beams, to increase the beams available when communicating with the user equipment and enhance the ability of the network device to communicate with the user equipment.

In a fifth implementation, the M beams are first beams that have been determined to be available for communication with the user equipment, and the beam quality monitoring signals transmitted through the M first beams are first beam quality monitoring signals.

The first detection report includes:

indication information of at least one beam of which the beam quality does not satisfy the first threshold among the M first beams, and/or, the beam quality of at least one beam of which the beam quality does not satisfy the first threshold among the M first beams.

The indication information of at least one beam of which the beam quality does not satisfy the first threshold among the M first beams, and/or, the beam quality of at least one beam of which the beam quality does not satisfy the first threshold among the M first beams described above may refer to the first implementation.

For the first detection report described above, the network device may delete, from the M first beams, at least one beam of which the beam quality does not satisfy the first threshold, to thereby avoid the information loss and damage or the longer time taken by the user equipment to receive the information or other bad results when transmitting the information to the user equipment through these beams.

Figure 3:
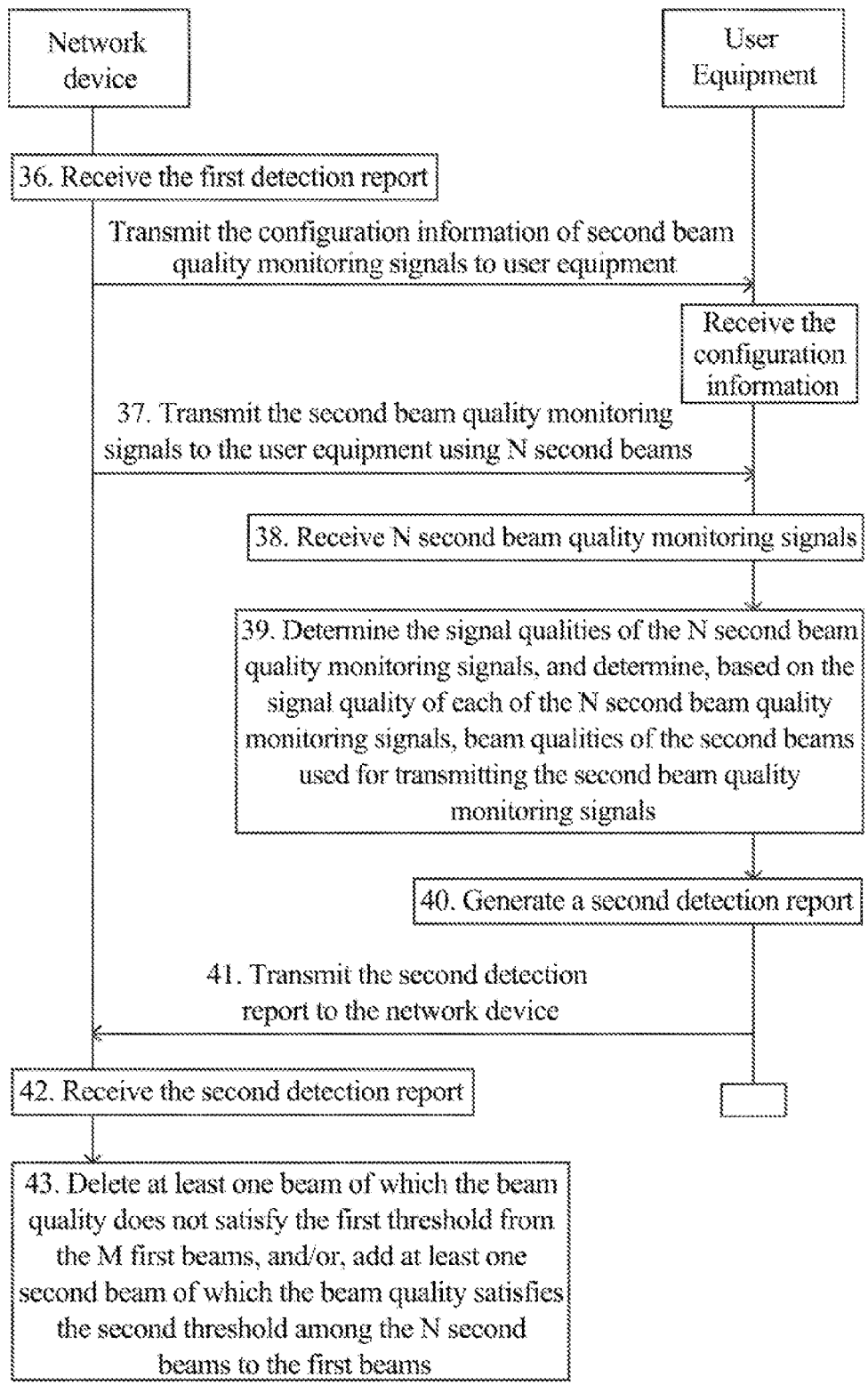
FIG. 3 is another flow schematic diagram of a beam detection method according to an embodiment of the present application.

Optionally, in combination with the above fifth implementation and referring to FIG. 3, the beam detection method further includes the following steps.

Step 37: the network device transmits the second beam quality monitoring signals to the user equipment using N second beams, where the second beams are beams that have not been determined to be used for communication with the user equipment and N is a positive integer.

Step 38: the user equipment receives N second beam quality monitoring signals.

Step 39: the user equipment determines the signal qualities of the N second beam quality monitoring signals, and determines, based on the signal quality of each of the N second beam quality monitoring signals, the beam qualities of the second beams used for transmitting the second beam quality monitoring signals.

Step 40: the user equipment generates a second detection report including: indication information of at least one beam of which the beam quality satisfies the second threshold among the N second beams, and/or, the beam quality of at least one beam of which the beam quality satisfies the second threshold.

The indication information of at least one beam of which the beam quality satisfies the second threshold among the N second beams, and/or, the beam quality of at least one beam of which the beam quality satisfies the second threshold among the N second beams described above may refer to the second implementation.

Step 41: the user equipment transmits the second detection report to the network device.

Step 42: the network device receives the second detection report.

Step 43: the network device deletes, from the M first beams, at least one beam of which the beam quality does not satisfy the first threshold, and/or, adds, to the first beams, at least one second beam of which the beam quality satisfies the second threshold among the N second beams. It should be understood that the above step of deleting, from the M first beams, at least one beam of which the beam quality does not satisfy the first threshold may also be performed at any time after step 36, for example, performed before step 37.

In the above technical solution, the network device may firstly transmit the first beam quality monitoring signals to the user equipment, and after receiving the first detection report and determining that there are beams of which the beam qualities do not satisfy the first threshold among the first beams, then transmits the second beam quality monitoring signals to the user equipment, and update the first beams according to the received second detection report, and delete at least one first beam of which the beam quality does not satisfy the first threshold, to thereby avoid the information loss and damage or the longer time taken by the user equipment to receive the information or other bad results when transmitting the information to the user equipment through these beams. It is also possible to add at least one second beam of which the beam quality satisfies the second threshold to the first beams, to increase the beams available when communicating with the user equipment and enhance the ability of the network device to communicate with the user equipment.

As an optional implementation, in combination with any one of the first, third, fourth and fifth implementations, the first detection report specifically includes:

indication information of all of L1 beams of which the beam qualities do not satisfy the first threshold among the first beams, and/or, beam qualities of K1 beams with the best or worst beam qualities among the L1 beams.

Here, K1 may be implemented in various ways. In an example, K1 is 1; in another example, K1 is a value (such as T) specified by the network device or communication protocol; in another example, K1 is the smaller one of L1 and H, where H is the maximum number of beam qualities that can be carried by the uplink resources used by the user equipment to transmit the first detection report. As another example, K1 is the smallest one of L1, T and H. As another example, K1 is the smallest one of L1 and Z, where Z is the maximum number of beams, which allow to be contained in the first detection report, received by the user equipment from the network device. As another example, K1 is the smallest one of L1 and Q, where Q is the maximum number of beams, of which the beam qualities do not satisfy the first threshold and which allow to be contained in the first detection report, received by the user equipment from the network device. As another example, K1 is the smallest one of L1 and W, where W is the maximum number of beam qualities, which allow to be contained in the first detection report, received by the user equipment from the network device. As another example, K1 is the smallest one of L1 and R, where R is the maximum number of beam qualities, which do not satisfy the first threshold and allow to be contained in the first detection report, received by the user equipment from the network device.

When the first detection report includes the beam qualities of K1 beams with the best beam qualities, the network device may measure the best communication quality of the first beams that do not meet the communication quality requirement based on this, as a consideration for adjusting the communication beams. When the first detection report includes the beam qualities of K1 beams with the worst beam qualities, the network device may know how much the first beams with the worst communication quality deteriorate, as a consideration for adjusting the communication beams.

As an optional mode, in combination with any one of the first, third, fourth and fifth implementations, the first detection report specifically includes:

indication information of K2 beams with the best or worst beam qualities among beams of which the beam qualities do not satisfy the first threshold among the first beams, and/or, the beam quality of at least one of the K2 beams.

The above K2 value may be indicated by the network device to the user equipment, for example, included in the configuration information of the beam quality monitoring signal, or the K2 value is specified by the communication protocol; or the K2 value is determined by the user equipment, the user equipment may not inform the network device of the K2, and the network device may perform the blind detection for decoding and learn the above information included in the first detection report. The user equipment may also inform the network device of the K2 value, where the K2 value may be included in the first detection report, or may be transmitted to the network device separately or transmitted to the network device together with other information (for example, beam measurement information). Alternatively, K2 is the smaller one of U and H1, where U is the total number of beams of which the beam qualities do not satisfy the first threshold and which are detected by the user equipment, and H1 is the maximum number of beams that can be carried by the uplink resources used by the user equipment to transmit the first detection report. As another example, K2 is the smallest one of U and Z1, where Z1 is the maximum number of beams, which allow to be contained in the first detection report, received by the user equipment from the network device. As another example, K2 is the smallest one of U and Q1, where Q1 is the maximum number of beams, of which the beam qualities do not satisfy the first threshold and which allow to be contained in the first detection report, received by the user equipment from the network device. As another example, K2 is the smallest one of U and W1, where W1 is the maximum number of beam qualities, which allow to be contained in the first detection report, received by the user equipment from the network device. As another example, K2 is the smallest one of U and R1, where R1 is the maximum number of beam qualities, which do not satisfy the first threshold and allow to be contained in the first detection report, received by the user equipment from the network device.

As an optional mode, in combination with any one of the second and third implementations, the first detection report specifically includes:

indication information of all of L2 beams of which the beam qualities satisfy the second threshold among the second beams, and/or, beam qualities of K3 beams with the best or worst beam qualities among the L2 beams.

Here, the implementation of K3 is similar to that of K1. For example, K3 may be 1, or the smaller one of L2 and H, or the smallest one of L2, T and H.

When the first detection report includes the beam qualities of K3 beams with the best beam qualities, the network device may measure the best communication quality of the second beams that meet the communication quality requirement based on this, as a consideration for adjusting the communication beams. When the first detection report includes the beam qualities of K1 beams with the worst beam qualities, the network device may know the lower limit of the communication quality of the second beams that meet the communication requirement, as a consideration for adjusting the communication beams.

As an optional mode, in combination with any one of the second and third implementations, the first detection report specifically includes:

indication information of K4 beams with the best or worst beam qualities among beams of which the beam qualities satisfy the second threshold among the second beams, and/or, the beam quality of at least one of the K4 beams.

The implementation of the above K4 may refer to K2, and will not be repeated in the present application.

As an optional mode, in combination with the above third implementation, the first detection report specifically includes:

indication information of K2 beams with the best or worst beam qualities among beams of which the beam qualities do not satisfy the first threshold among the first beams, and/or, the beam quality of at least one of the K2 beams, for example, a set number of beam qualities that are best or worst among the K2 beams; and indication information of K4 beams with the best or worst beam qualities among beams of which the beam qualities satisfy the second threshold among the second beams, and/or, the beam quality of at least one of the K4 beams, for example, a set number of beam qualities that are best or worst among the K4 beams;

wherein K2 is less than or equal to the total number of beams of which the beam qualities do not satisfy the first threshold among the first beams. In other words, the first detection report may include the indication information of all the beams that do not satisfy the first threshold. K4 is less than or equal to the total number of beams of which the beam qualities satisfy the second threshold among the second beams. In other words, the first detection report may include the indication information of all the beams that satisfy the second threshold.

As an optional mode, in combination with any one of the fourth and fifth implementations, the second detection report specifically includes:

indication information of all of L2 beams of which the beam qualities satisfy the second threshold among the second beams, and/or, beam qualities of K3 beams with the best or worst beam qualities among the L2 beams, wherein K3 is the smaller one of L2 and H, and H is the maximum number of beam qualities that can be carried by the uplink resources used by the user equipment to transmit the first detection report.

When the second detection report includes the beam qualities of K3 beams with the best beam qualities, the network device may measure the best communication quality of the second beams that meet the communication quality requirement based on this, as a consideration for adjusting the communication beams. When the second detection report includes the beam qualities of K1 beams with the worst beam qualities, the network device may know the lower limit of the communication quality of the second beams that meet the communication requirement, as a consideration for adjusting the communication beams.

As an optional mode, in combination with any one of the fourth and fifth implementations, the second detection report specifically includes:

indication information of K4 beams with the best or worst beam qualities among beams of which the beam qualities satisfy the second threshold among the second beams, and/or, the beam quality of at least one of the K4 beams.

As an optional mode, when the first detection report includes the indication information of at least two first beams, the indication information of the at least two first beams is sorted according to the level of the beam qualities of beams;

and/or, when the first detection report includes beam qualities of at least two first beams, the beam qualities of the at least two first beams are sorted according to the level of the beam qualities of beams.

In the above technical solution, the indication information of the beams or the beam qualities of the beams in the detection report is/are sorted according to the level of the beam qualities of beams, which facilitates the network device to learn the relative advantage and disadvantage of the beams quickly, simplifies the decoding work of the network device, and improves the efficiency of the beam detection.

As an optional mode, when the first detection report includes the indication information of at least two second beams, the indication information of the at least two second beams is sorted according to the level of the beam qualities of beams;

and/or, when the first detection report includes the beam qualities of at least two second beams, the beam qualities of the at least two second beams are sorted according to the level of the beam qualities of beams.

In the above technical solution, the indication information of the beams or the beam qualities of the beams in the detection report is/are sorted according to the level of the beam qualities of beams, which facilitates the network device to learn the relative advantage and disadvantage of the beams quickly, simplifies the decoding work of the network device, and improves the efficiency of the beam detection.

As an optional mode, when the second detection report includes the indication information of at least two second beams, the indication information of the at least two second beams is sorted according to the level of the beam qualities of beams;

and/or, when the second detection report includes the beam qualities of at least two second beams, the beam qualities of the at least two second beams are sorted according to the level of the beam qualities of beams.

In the above technical solution, the indication information of the beams or the beam qualities of the beams in the detection report is/are sorted according to the level of the beam qualities of beams, which facilitates the network device to learn the relative advantage and disadvantage of the beams quickly, simplifies the decoding work of the network device, and improves the efficiency of the beam detection.

As an optional mode, the first detection report and/or the second detection report further include(s) the padding bits or reserved bits.

The padding bits or reserved bits may be implemented in various ways, including but not limited to the followings.

(a) Dummy bits, where the number of dummy bits may be the number indicated by the network device, or the number specified by the communication protocol, or the number determined by the user equipment (for example, the user equipment fills the dummy bits in the first detection report until the overhead of the first detection report is a preset value, to facilitate the network device to decode). The user equipment may inform the network device of the number of dummy bits.

(b) Other information of the user equipment that needs to be reported to the network device, e.g., the position information of the user equipment, the beam/cell measurement information of the user equipment, etc., so as to improve the transmission resource utilization and reduce the system overhead.

(c) When the detection report includes the indication information and/or beam qualities of the beams of which the beam qualities do not satisfy the first threshold, the detection report may further include the indication information and/or beam quality of at least one beam of which the beam quality satisfies the first threshold, e.g., the beam qualities of K5 beams with the worst beam qualities among the beams satisfying the first threshold. The above technical solution may facilitate the network device to learn the communication quality of the first beams more comprehensively, and facilitate the adjustment of the communication beams.

(d) When the detection report includes the indication information and/or beam qualities of the beams of which the beam qualities satisfy the second threshold, the detection report may further include the indication information and/or beam qualities of the beams of which the beam qualities do not satisfy the second threshold, e.g., the beam qualities of K6 beams with the best beam qualities among the beams that do not satisfy the second threshold. The above technical solution may facilitate the network device to learn the communication quality of the second beams more comprehensively, and facilitate the adjustment of the communication beams.

Optionally, the user equipment may report the position or length of the padding bits or reserved bits and the above K5 and K6 to the network device, so as to facilitate the network device to parse. Alternatively, the position or length of the padding bits or reserved bits and the above K5 and K6 may be indicated by the network device to the user equipment in advance, or the position or length of the padding bits or reserved bits and the above K5 and K6 may be specified by the communication protocol in advance.

As an optional mode, the first detection report further includes:

indication information indicating the quantity of indication information of beams of which the beam qualities do not satisfy the first threshold in the first detection report; and/or indication information indicating the quantity of beam qualities of beams of which the beam qualities do not satisfy the first threshold in the first detection report; and/or indication information indicating the quantity of indication information of beams of which the beam qualities satisfy the second threshold in the first detection report; and/or indication information indicating the quantity of beam qualities of beams of which the beam qualities satisfy the second threshold in the first detection report.

In the above technical solution, the user equipment informs the network device of the quantities of various types of information that may be included in the first detection report, facilitating the network device to parse and improving the efficiency of the beam detection.

As an optional mode, the second detection report further includes:

indication information indicating the quantity of indication information of beams of which the beam qualities satisfy the second threshold included in the second detection report; and/or indication information indicating the quantity of beam qualities of beams of which the beam qualities satisfy the second threshold included in the second detection report.

In the above technical solution, the user equipment informs the network device of the quantities of various types of information that may be included in the second detection report, facilitating the network device to parse and improving the efficiency of the beam detection.

As an optional mode, the first detection report further includes:

indication information indicating the position of indication information of beams of which the beam qualities do not satisfy the first threshold included in the first detection report; and/or indication information indicating positions of beam qualities of beams of which the beam qualities do not satisfy the first threshold included in the first detection report; and/or indication information indicating the position of indication information of beams of which the beam qualities satisfy the second threshold included in the first detection report; and/or indication information indicating positions of beam qualities of beams of which the beam qualities satisfy the second threshold included in the first detection report.

In the above technical solution, the user equipment informs the network device of the positions, in the first detection report, of various types of information that may be included in the first detection report, facilitating the network device to parse and improving the efficiency of the beam detection.

As an optional mode, the second detection report further includes:

indication information indicating the position of indication information of beams of which the beam qualities satisfy the second threshold included in the second detection report; and/or indication information indicating positions of beam qualities of beams of which the beam qualities satisfy the second threshold included in the second detection report.

In the above technical solution, the user equipment informs the network device of the positions, in the second detection report, of various types of information that may be included in the second detection report, facilitating the network device to parse and improving the efficiency of the beam detection.

As an optional mode, the first detection report or the second detection report further includes:

information indicating the type of the detection report, wherein the type of the detection report includes: a detection report of beams not satisfying the first threshold, a detection report of beams satisfying the second threshold, and a detection report of beams not satisfying the first threshold and beams satisfying the second threshold.

In the above technical solution, the user equipment informs the network device of the type of the detection report, facilitating the network device to parse and improving the efficiency of the beam detection.

As an optional mode, the network device firstly transmits the configuration information to the user equipment before transmitting the beam quality monitoring signals to the user equipment, where the configuration information is used for indicating the user equipment to receive the beam quality monitoring signals according to the indicated configuration parameters (e.g., the number of antenna ports of the beam quality monitoring signals, the antenna ports of the beam quality monitoring signals, the time-frequency locations of the beam quality monitoring signals). The user equipment receives the configuration information, detects the beam quality monitoring signals according to the configuration information, and receives the beam quality monitoring signals.

As an optional mode, the network device further transmits the second configuration information to the user equipment, where the second configuration information may be transmitted before the beam quality monitoring signals are transmitted or may be transmitted after the beam quality monitoring signals are transmitted, which is not limited by the embodiments of the present application. The second configuration information includes:

indication information indicating the quantity of indication information of beams of which the beam qualities do not satisfy the first threshold in the first detection report; and/or indication information indicating the quantity of beam qualities of beams of which the beam qualities do not satisfy the first threshold in the first detection report; and/or indication information indicating the quantity of indication information of beams of which the beam qualities satisfy the second threshold in the first or second detection report; and/or indication information indicating the quantity of beam qualities of beams of which the beam qualities satisfy the second threshold in the first or second detection report.

In the above technical solution, the network device may agree with the user equipment on the quantity of beams of which the information needs to be reported, improving the efficiency of the beam detection.

Optionally, the above configuration information and second configuration information may be the same configuration information, or may be different configuration information.

Optionally, the above second configuration information further includes:

indication information indicating the position of indication information of beams of which the beam qualities do not satisfy the first threshold in the first detection report; and/or indication information indicating positions of beam qualities of beams of which the beam qualities do not satisfy the first threshold in the first detection report; and/or indication information indicating the position of indication information of beams of which the beam qualities satisfy the second threshold in the first or second detection report; and/or indication information indicating the position of beam qualities of beams of which the beam qualities satisfy the second threshold in the first or second detection report.

In the above technical solution, the network device may agree with the user equipment on the position of the information that needs to be reported in the detection report, improving the efficiency of the beam detection.

Optionally, the above second configuration information further includes:

information indicating the type of the first detection report, wherein the type of the first detection report includes: a detection report of beams not satisfying the first threshold, a detection report of beams satisfying the second threshold, and a detection report of beams not satisfying the first threshold and beams satisfying the second threshold.

In the above technical solution, the network device agrees with the user equipment on the type of the detection report, which can improve the efficiency of the beam detection.

Optionally, the quantity of indication information of beams of which the beam qualities do not satisfy the first threshold in the first detection report is a first quantity agreed with the network device; and/or the quantity of beam qualities of beams of which the beam qualities do not satisfy the first threshold in the first detection report is a second quantity agreed with the network device; and/or the quantity of indication information of beams of which the beam qualities satisfy the second threshold in the first or second detection report is a third quantity agreed with the network device; and/or the quantity of beam qualities of beams of which the beam qualities satisfy the second threshold in the first or second detection report is a fourth quantity agreed with the network device.

The above first to fourth quantities may be notified by the network device to the user equipment by transmitting the indication information (such as contained in the foregoing configuration information), or may be prescribed by the communication protocol.

As an optional mode, when the user equipment transmits the first or second detection report to the network device, it may collide with transmitting other signals to the network device, so the user equipment may perform the following process.

By taking the case that the user equipment transmits the first detection report as an example, when transmitting of the first detection report by the user equipment on the first uplink resource (for example PUCCH1) for transmitting the first detection report collides with transmitting of a third signal to the network device on the second uplink resource (for example PUCCH2), then:

the user equipment cancels the transmitting of the third signal on the second uplink resource, and transmits the first detection report on the first resource; or the user equipment cancels the transmitting of the signal on the second uplink resource, and transmits the first detection report and the third signal on the first resource; or the user equipment cancels the transmitting of the first detection report on the first uplink resource, and transmits the first detection report on the second resource; or the user equipment cancels the transmitting of the first detection report on the first uplink resource, and transmits the first detection report and the third signal on the second resource; or the user equipment cancels the transmitting of the first detection report on the first uplink resource and transmits the third signal on the second resource, and the user equipment transmits the first detection report to the network device at another subsequent moment at which the first detection report can be transmitted.

Correspondingly, when receiving the first detection report, the network device may perform the following process:

the network device cancels the reception of the third signal transmitted on the second uplink resource, and receives the first detection report transmitted on the first resource; or the network device cancels the reception of the third signal transmitted on the second uplink resource, and receives the first detection report and the third signal transmitted on the first resource; or the network device cancels the reception of the first detection report transmitted on the first uplink resource, and receives the first detection report transmitted on the second resource; or the network device cancels the reception of the first detection report transmitted on the first uplink resource, and receives the first detection report and the third signal transmitted on the second resource.

It should be understood that the cancellation of transmitting the third signal may refer to cancellation of the current transmitting, and the user equipment may transmit the third signal to the network device later. Furthermore, the receiving behavior of the network device corresponds to the transmitting behavior of the user equipment. For example, when the user equipment cancels transmitting a signal on the second uplink resource and transmits the first detection report and the third signal on the first resource, the network device cancels receiving the third signal transmitted on the second uplink resource and receives the first detection report and the third signal transmitted on the first resource. Furthermore, the above processing method is completely applicable to the reporting and receiving of the second detection report.

In the above technical solution, the user equipment and the network device appoint the processing mechanism when transmitting by the user equipment a detection report collides with transmitting other signals, to avoid the communication errors and improve the system reliability.

As an optional mode, the user equipment may not inform the network device of the quantity, position and the like of all or a part of the information in the detection report, and the network device may perform the blind detection on the detection report according to the blind detection rule to determine each type of information in the detection report.

It should be noted that, in the embodiments of the present application, for the information in the first or second detection report, the user equipment may transmit it to the network device on one uplink resource at a time or may transmit it to the network device in batches on different uplink resources. For example, the first detection report includes the foregoing indication information indicating the quantity of the indication information of the beams of which the beam qualities do not satisfy the first threshold included in the first detection report, and the user equipment may firstly transmit the indication information indicating the quantity to the network device and then transmit the indication information of the beams of which the beam qualities do not satisfy the first threshold to the network device.

Figure 4:
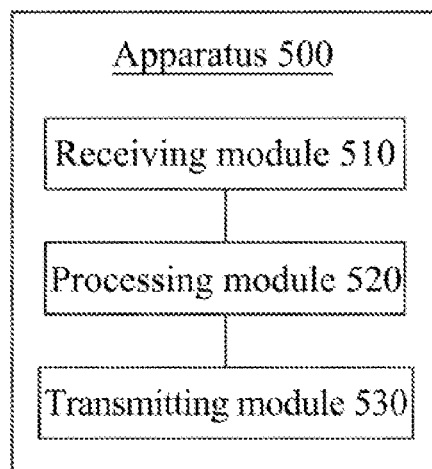
FIG. 4 is a schematic diagram of a beam detection apparatus 500 according to an embodiment of the present application.

FIG. 4 is a schematic diagram of a beam detection apparatus 500 according to an embodiment of the present application. The apparatus 500 includes:

a receiving module 510 configured to receive the beam quality monitoring signals transmitted by a network device using M beams, wherein the beam quality monitoring signals are signals used for monitoring the beam quality and M is a positive integer;

a processing module 520 configured to determine the signal qualities of the M beam quality monitoring signals, determine, based on the signal quality of each of the M beam quality monitoring signals, the beam qualities of the beams used for transmitting the beam quality monitoring signals, and generate a first detection report, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold;

a transmitting module 530 configured to transmit the first detection report to the network device.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality does not satisfy the first threshold among the M1 first beams, and/or, the beam quality of at least one beam of which the beam quality does not satisfy the first threshold among the M1 first beams.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality satisfies the second threshold among the M2 second beams, and/or, the beam quality of at least one beam of which the beam quality satisfies the second threshold among the M2 second beams.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes:

indication information of at least one beam of which the beam quality does not satisfy the first threshold among the M1 first beams, and/or, the beam quality of at least one beam of which the beam quality does not satisfy the first threshold among the M1 first beams;

and, indication information of at least one beam of which the beam quality satisfies the second threshold among the M2 second beams, and/or, the beam quality of at least one beam of which the beam quality satisfies the second threshold among the M2 second beams.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes:

indication information of at least one beam of which the beam quality does not satisfy the first threshold among the M1 first beams, and/or, the beam quality of at least one beam of which the beam quality does not satisfy the first threshold among the M1 first beams.

The processing module is further configured to: generate a second detection report after determining beam quality parameters of the M beams, wherein the second detection report includes: indication information of at least one beam of which the beam quality satisfies the second threshold among the M2 second beams, and/or, the beam quality of at least one beam of which the beam quality satisfies the second threshold among the M2 second beams.

The transmitting module is further configured to transmit the second detection report to the network device.

Optionally, the M beams are first beams that have been determined to be available for communication with the user equipment, and the beam quality monitoring signals transmitted through the M first beams are first beam quality monitoring signals.

The first detection report specifically includes:

indication information of at least one beam of which the beam quality does not satisfy the first threshold among the M first beams, and/or, the beam quality of at least one beam of which the beam quality does not satisfy the first threshold among the M first beams.

Optionally, the receiving module is further configured to: receive the second beam quality monitoring signals transmitted by the network device using N second beams after the transmitting module transmits the first detection report to the network device, wherein the second beams are beams that has not been determined to be used for communication with the user equipment and N is a positive integer.

The processing module is further configured to: determine signal qualities of the N second beam quality monitoring signals, determine, based on the signal quality of each of the N second beam quality monitoring signals, the beam qualities of the second beams used for transmitting the second beam quality monitoring signals, and generate a second detection report, wherein the second detection report includes: indication information of at least one beam of which the beam quality satisfies the second threshold among the N second beams, and/or, the beam quality of at least one beam of which the beam quality satisfies the second threshold.

The transmitting module is further configured to transmit the second detection report to the network device.

Optionally, the first detection report specifically includes:

indication information of all of L1 beams of which the beam qualities do not satisfy the first threshold among the first beams, and/or, beam qualities of K1 beams with the best or worst beam qualities among the L1 beams, wherein K1 is 1, or K is the smaller one of L1 and H, and H is the maximum number of beam qualities that can be carried by uplink resources used by the user equipment to transmit the first detection report.

Optionally, the first detection report specifically includes:

indication information of K2 beams with the best or worst beam qualities among beams of which the beam qualities do not satisfy the first threshold among the first beams, and/or, the beam quality of at least one of the K2 beams.

Optionally, the first detection report specifically includes:

indication information of all of L2 beams of which the beam qualities satisfy the second threshold among the second beams, and/or, beam qualities of K3 beams with the best or worst beam qualities among the L2 beams, wherein K3 is 1, or K3 is the smaller one of L2 and H, and H is the maximum number of beam qualities that can be carried by uplink resources used by the user equipment to transmit the first detection report.

Optionally, the first detection report specifically includes:

indication information of K4 beams with the best or worst beam qualities among beams of which the beam qualities satisfy the second threshold among the second beams, and/or, the beam quality of at least one of the K4 beams.

Optionally, the first detection report specifically includes:

indication information of K2 beams of which the best or worst beam qualities among beams of which the beam qualities do not satisfy the first threshold among the first beams, and/or, the beam quality of at least one of the K2 beams; and indication information of K4 beams of which the best or worst beam qualities among beams of which the beam qualities satisfy the second threshold among the second beams, and/or, the beam quality of at least one of the K4 beams;

wherein K2 is less than or equal to the total number of beams of which the beam qualities do not satisfy the first threshold among the first beams, and K4 is less than or equal to the total number of beams of which the beam qualities satisfy the second threshold among the second beams.

Optionally, the second detection report specifically includes:

indication information of all of L2 beams of which the beam qualities satisfy the second threshold among the second beams, and/or, beam qualities of K3 beams with the best or worst beam qualities among the L2 beams, wherein K3 is 1, or K3 is the smaller one of L2 and H, and H is the maximum number of beam qualities that can be carried by uplink resources used by the user equipment to transmit the first detection report.

Optionally, the second detection report specifically includes:

indication information of K4 beams of which the best or worst beam qualities among beams of which the beam qualities satisfy the second threshold among the second beams, and/or, the beam quality of at least one of the K4 beams.

Optionally, determining by the processing module 520 the beam quality of the beam includes:

taking the signal quality of the beam quality monitoring signal transmitted through the beam as the beam quality of the beam; or determining a hypothetical communication quality of a resource set corresponding to the beam based on the signal quality of the beam quality monitoring signal transmitted through the beam, and taking the hypothetical communication quality of the resource set corresponding to the beam as the beam quality of the beam; or determining a hypothetical communication quality of a downlink channel corresponding to the beam based on the signal quality of the beam quality monitoring signal transmitted through the beam, and taking the hypothetical communication quality of the downlink channel corresponding to the beam as the beam quality of the beam; or determining a hypothetical communication quality of a search space corresponding to the beam based on the signal quality of the beam quality monitoring signal transmitted through the beam, and taking the hypothetical communication quality of the search space corresponding to the beam as the beam quality of the beam.

Optionally, when the first detection report includes indication information of at least two first beams, the indication information of the at least two first beams is sorted according to the beam qualities of beams;

and/or, when the first detection report includes beam qualities of at least two first beams, the beam qualities of the at least two first beams are sorted according to the beam qualities of beams.

Optionally, when the first detection report includes indication information of at least two second beams, the indication information of the at least two second beams is sorted according to the beam qualities of beams;

and/or, when the first detection report includes beam qualities of at least two second beams, the beam qualities of the at least two second beams are sorted according to the beam qualities of beams.

Optionally, the first detection report further includes padding bits or reserved bits.

Optionally, the padding bits include: beam qualities of K5 beams with worst beam qualities among beams satisfying the first threshold, and/or, beam qualities of K6 beams with worst beam qualities among beams not satisfying the second threshold.

Optionally, the first detection report further includes:

indication information indicating the quantity of indication information of beams of which the beam qualities do not satisfy the first threshold in the first detection report; and/or indication information indicating the quantity of beam qualities of beams of which the beam qualities do not satisfy the first threshold in the first detection report; and/or indication information indicating the quantity of indication information of beams of which the beam qualities satisfy the second threshold in the first detection report; and/or indication information indicating the quantity of beam qualities of beams of which the beam qualities satisfy the second threshold in the first detection report; and/or indication information indicating the position of indication information of beams of which the beam qualities do not satisfy the first threshold in the first detection report; and/or indication information indicating positions of beam qualities of beams of which the beam qualities do not satisfy the first threshold in the first detection report; and/or indication information indicating the position of indication information of beams of which the beam qualities satisfy the second threshold in the first detection report; and/or indication information indicating positions of beam qualities of beams of which the beam qualities satisfy the second threshold in the first detection report; and/or information indicating the type of the first detection report, wherein the type of the first detection report includes: a detection report of beams not satisfying the first threshold, a detection report of beams satisfying the second threshold, and a detection report of beams not satisfying the first threshold and beams satisfying the second threshold; and/or information indicating the maximum amount of beam indication information allowed to be contained in the first detection report; and/or information indicating the maximum number of beam qualities allowed to be contained in the first detection report.

Optionally, the quantity of indication information of beams of which the beam qualities do not satisfy the first threshold in the first detection report is a first quantity agreed with the network device; and/or the quantity of beam qualities of beams of which the beam qualities do not satisfy the first threshold in the first detection report is a second quantity agreed with the network device; and/or the quantity of indication information of beams of which the beam qualities satisfy the second threshold in the first detection report is a third quantity agreed with the network device; and/or the quantity of beam qualities of beams of which the beam qualities satisfy the second threshold in the first detection report is a fourth quantity agreed with the network device.

Optionally, the transmitting module 530 is specifically configured to:

when transmitting of the first detection report on first uplink resource for transmitting the first detection report collides with transmitting of a third signal to the network device on second uplink resource, then: cancel the transmitting of the third signal on the second uplink resource, and transmit the first detection report on the first resource; or cancel the transmitting of the third signal on the second uplink resource, and transmit the first detection report and the third signal on the first resource; or cancel the transmitting of the first detection report on the first uplink resource, and transmit the first detection report on the second resource; or cancel the transmitting of the first detection report on the first uplink resource, and transmit the first detection report and the third signal on the second resource.

Optionally, the receiving module 510 is further configured to: receive the configuration information transmitted by the network device before receiving the beam quality monitoring signals transmitted by the network device, wherein the configuration information is used for indicating the user equipment to receive the beam quality monitoring signals according to the indicated configuration parameters.

Optionally, the receiving module 510 is further configured to: receive the second configuration information transmitted by the network device before generating the first detection report, wherein the second configuration information includes:

indication information indicating the quantity of indication information of beams of which the beam qualities do not satisfy the first threshold in the first detection report; and/or indication information indicating the quantity of beam qualities of beams of which the beam qualities do not satisfy the first threshold in the first detection report; and/or indication information indicating the quantity of indication information of beams of which the beam qualities satisfy the second threshold in the first detection report; and/or indication information indicating the quantity of beam qualities of beams of which the beam qualities satisfy the second threshold in the first detection report; and/or indication information indicating the position of indication information of beams of which the beam qualities do not satisfy the first threshold in the first detection report; and/or indication information indicating positions of beam qualities of beams of which the beam qualities do not satisfy the first threshold in the first detection report; and/or indication information indicating the position of indication information of beams of which the beam qualities satisfy the second threshold in the first detection report; and/or indication information indicating positions of beam qualities of beams of which the beam qualities satisfy the second threshold in the first detection report; and/or information indicating the type of the first detection report that includes: a detection report of beams not satisfying the first threshold, a detection report of beams satisfying the second threshold, and a detection report of beams not satisfying the first threshold and beams satisfying the second threshold; and/or information indicating the maximum amount of beam indication information allowed to be contained in the first detection report; and/or information indicating the maximum number of beam qualities allowed to be contained in the first detection report.

The implementations of the above apparatus 500 and its modules may refer to the steps performed by the user equipment in the above beam detection method, and will not be repeated in the embodiments of the present application.

Figure 5:
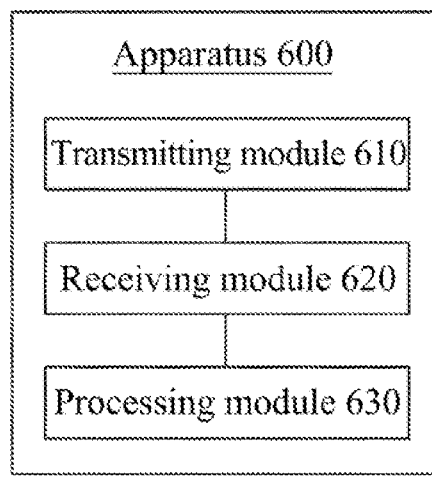
FIG. 5 is a schematic diagram of a beam detection apparatus 600 according to an embodiment of the present application.

FIG. 5 is a schematic diagram of a beam detection apparatus 600 provided by an embodiment of the present application. The apparatus 600 includes:

a transmitting module 610 configured to transmit the beam quality monitoring signals using M beams, wherein the beam quality monitoring signals are signals used for monitoring the beam quality and M is a positive integer;

a receiving module 620 configured to receive a first detection report transmitted by a user equipment, wherein the first detection report includes at least one of: indication information of at least one beam of which the beam quality does not satisfy a first threshold among the M beams, the beam quality of at least one beam of which the beam quality does not satisfy the first threshold, indication information of at least one beam of which the beam quality satisfies a second threshold, and the beam quality of at least one beam of which the beam quality satisfies the second threshold.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams.

The apparatus 600 further includes:

a processing module 630 configured to delete at least one beam of which the beam quality does not satisfy the first threshold from the first beams after the receiving module receives the first detection report.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality satisfies the second threshold among the M2 second beams, and/or, the beam quality of at least one beam of which the beam quality satisfies the second threshold among the M2 second beams.

The apparatus further includes:

a processing module 630 configured to add at least one second beam of which the beam quality satisfies the second threshold to the first beams after the receiving module receives the first detection report.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals.

The first detection report includes: indication information of at least one beam of which the beam quality does not satisfy the first threshold among the M1 first beams, and/or, the beam quality of at least one beam of which the beam quality does not satisfy the first threshold among the M1 first beams; and indication information of at least one beam of which the beam quality satisfies the second threshold among the M2 second beams, and/or, the beam quality of at least one beam of which the beam quality satisfies the second threshold among the M2 second beams.

The apparatus further includes:

a processing module 630 configured to delete at least one beam of which the beam quality does not satisfy the first threshold from the first beams, and/or, add at least one second beam of which the beam quality satisfies the second threshold to the first beams after the receiving module receives the first detection report.

Optionally, the M beams include M1 first beams that have been determined to be available for communication with the user equipment and M2 second beams that have not been determined to be used for communication with the user equipment, the beam quality monitoring signals transmitted through the first beams are first beam quality monitoring signals, and the beam quality monitoring signals transmitted through the second beams are second beam quality monitoring signals; the first detection report includes: indication information of at least one beam of which the beam quality does not satisfy the first threshold among the M1 first beams, and/or, the beam quality of at least one beam of which the beam quality does not satisfy the first threshold among the M1 first beams.

The receiving module 620 is further configured to receive a second detection report transmitted by the user equipment, wherein the second detection report includes: indication information of at least one beam of which the beam quality satisfies the second threshold among the M2 second beams, and/or, the beam quality of at least one beam of which the beam quality satisfies the second threshold among the M2 second beams.

The apparatus further includes:

a processing module 630 configured to delete at least one beam of which the beam quality does not satisfy the first threshold from the first beams, and/or, add at least one second beam of which the beam quality satisfies the second threshold to the first beams after the receiving module receives the first detection report.

Optionally, the M beams are first beams that have been determined to be available for communication with the user equipment, and beam quality monitoring signals transmitted through the M first beams are first beam quality monitoring signals; the first detection report specifically includes: indication information of at least one beam of which the beam quality does not satisfy the first threshold among the M first beams, and/or, the beam quality of at least one beam of which the beam quality does not satisfy the first threshold among the M first beams.

The transmitting module 610 is further configured to: transmit the second beam quality monitoring signals to the user equipment using N second beams after the receiving module receives the first detection report, wherein the second beams are beams that have not been determined to be used for communication with the user equipment and N is a positive integer.

The receiving module 620 is further configured to: receive a second detection report reported by the user equipment, wherein the second detection report includes: indication information of at least one beam of which the beam quality satisfies the second threshold among the N second beams, and/or, the beam quality of at least one beam of which the beam quality satisfies the second threshold.

The apparatus further includes:

a processing module 630 configured to delete at least one beam of which the beam quality does not satisfy the first threshold from the first beams, and/or, add at least one second beam of which the beam quality satisfies the second threshold to the first beams after the receiving module receives the first detection report and the second detection report.

Optionally, the transmitting module 610 is further configured to: transmit the configuration information to the user equipment before transmitting the beam quality monitoring signals to the user equipment, wherein the configuration information is used for indicating the user equipment to receive the beam quality monitoring signals according to the indicated configuration parameters.

Optionally, the transmitting module 610 is further configured to: transmit the second configuration information to the user equipment, wherein the second configuration information includes:

indication information indicating the type of the first detection report reported by the user equipment; and/or indication information indicating the quantity of indication information of beams of which the beam qualities do not satisfy the first threshold in the first detection report; and/or indication information indicating the quantity of beam qualities of beams of which the beam qualities do not satisfy the first threshold in the first detection report; and/or indication information indicating the quantity of indication information of beams of which the beam qualities satisfy the second threshold in the first detection report; and/or indication information indicating the quantity of beam qualities of beams of which the beam qualities satisfy the second threshold in the first detection report; and/or indication information indicating the position of indication information of beams of which the beam qualities do not satisfy the first threshold in the first detection report; and/or indication information indicating positions of beam qualities of beams of which the beam qualities do not satisfy the first threshold in the first detection report; and/or indication information indicating the position of indication information of beams of which the beam qualities satisfy the second threshold in the first detection report; and/or indication information indicating positions of beam qualities of beams of which the beam qualities satisfy the second threshold in the first detection report; and/or information indicating the maximum amount of beam indication information allowed to be contained in the first detection report; and/or information indicating the maximum number of beam qualities allowed to be contained in the first detection report.

Optionally, the receiving module 620 is specifically configured to:

when transmitting of the first detection report by the user equipment on first uplink resource for transmitting the first detection report collides with transmitting of a third signal to the network device on second uplink resource, then:

cancel the reception of the third signal transmitted on the second uplink resource, and receive the first detection report transmitted on the first resource; or cancel the reception of the third signal transmitted on the second uplink resource, and receive the first detection report and the third signal transmitted on the first resource; or cancel the reception of the first detection report transmitted on the first uplink resource, and receive the first detection report transmitted on the second resource; or cancel the reception of the first detection report transmitted on the first uplink resource, and receive the first detection report and the third signal transmitted on the second resource.

Optionally, the processing module 630 blindly detects the first detection report according to a blind detection rule after receiving the first detection report transmitted by the user equipment.

The specific implementations of the above apparatus 600 and its modules may refer to the steps performed by the network device in the above beam detection method, and will not be repeated in the embodiments of the present application.

Figure 6:
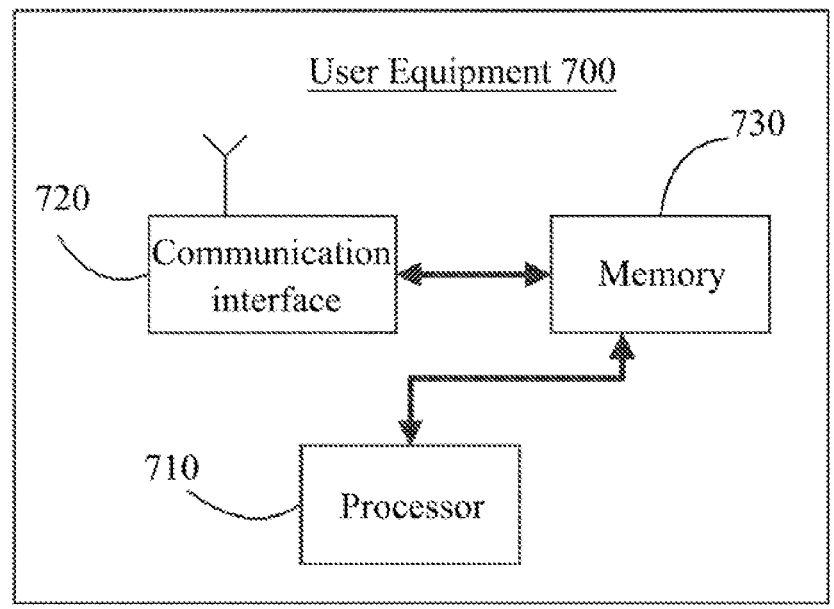
FIG. 6 is a schematic diagram of a user equipment 700 according to an embodiment of the present application.

FIG. 6 is a schematic diagram of a user equipment 700 in an embodiment of the present application. The user equipment 700 includes:

a memory 710 configured to store computer instructions;

a communication interface 720 configured to communicate with a network device;

a processor 730 connected communicatively to the memory and the communication interface respectively and configured to execute the computer instructions to perform the steps performed by the user equipment in the above beam detection method when executing the computer instructions.

The above processor 730 may be a processing element or a collective term of multiple processing elements. For example, the processor 730 may be a Central Processing Unit (CPU) or Application Specific Integrated Circuit (ASIC) or one or more integrated circuits configured to implement the embodiments of the invention, e.g., one or more Digital Signal Processors (DSPs), or one or more Field Programmable Gate Arrays (FPGAs).

The above memory 710 may be a storage component or a collective term of multiple storage components, and used to store the executable program code, data and so on. And, the memory may include Random-Access Memory (RAM), and may also include Non-Volatile Memory (NVM), e.g., disk memory, flash memory (Flash) or the like.

The implementations of the above user equipment 700 and its components may refer to the steps performed by the user equipment in the above beam detection method, and will not be repeated in the embodiments of the present application.

An embodiment of the present application further provides a network device, of which the structure may continue to refer to FIG. 6. The network device includes:

a memory configured to store computer instructions;

a communication interface configured to communicate with a user equipment;

a processor connected communicatively to the memory and the communication interface respectively and configured to execute the computer instructions to perform the steps performed by the network device in the above beam detection method when executing the computer instructions.

The above processor may be a processing element or a collective term of multiple processing elements. For example, the processor may be a Central Processing Unit (CPU) or Application Specific Integrated Circuit (ASIC) or one or more integrated circuits configured to implement the embodiments of the invention, e.g., one or more Digital Signal Processors (DSPs), or one or more Field Programmable Gate Arrays (FPGAs).

The above memory may be a storage component or a collective name of multiple storage components, and used to store the executable program code, data and so on. And, the memory may include Random-Access Memory (RAM), and may also include Non-Volatile Memory (NVM), e.g., disk memory, flash memory (Flash) or the like.

The specific implementations of the above network device and its components may refer to the steps performed by the network device in the above beam detection method, and will not be repeated in the embodiments of the present application.

The present application provides a computer readable storage medium storing the computer instructions therein, where the computer instructions cause a computer to perform some or all of the steps in the above beam detection method when running on the computer.

The present application provides a computer program product that causes a computer to perform some or all of the steps in the above beam detection method when running on the computer.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A beam detection method, comprising:

receiving, by a user equipment, beam quality monitoring signals transmitted by a network device using M beams, wherein the beam quality monitoring signals are signals used for monitoring beam quality and M is a positive integer;

determining, by the user equipment, signal qualities of the M beam quality monitoring signals, and determining, based on the signal quality of each of the M beam quality monitoring signals, beam qualities of the beams used for transmitting the beam quality monitoring signals;

generating, by the user equipment, a first detection report, and transmitting, by the user equipment, the first detection report to the network device, wherein the M beams comprise M1 first beams that have been determined to be available for communication with the user equipment and M2 second beams that have not been determined to be used for communication with the user equipment, wherein the first detection report comprises:
- at least one of indication information of at least one beam of which the beam quality does not satisfy a first threshold among the M1 first beams, or the beam quality of at least one beam of which the beam quality does not satisfy the first threshold among the M1 first beams, and
- at least one of indication information of at least one beam of which the beam quality satisfies a second threshold among the M2 second beams, or the beam quality of at least one beam of which the beam quality satisfies the second threshold among the M2 second beams;
wherein a beam communication quality represented by the second threshold is higher than or equal to a beam communication quality represented by the first threshold; or generating, by the user equipment, a first detection report, and transmitting, by the user equipment, the first detection report to the network device, wherein the M beams are first beams that have been determined to be available for communication with the user equipment, the first detection report comprises at least one of: indication information of at least one beam of which the beam quality does not satisfy the first threshold among the M first beams, or the beam quality of at least one beam of which the beam quality does not satisfy the first threshold among the M first beams; receiving, by the user equipment, second beam quality monitoring signals transmitted by the network device using N second beams, wherein the second beams are beams that has not been determined to be used for communication with the user equipment, and N is a positive integer; determining, by the user equipment, signal qualities of the N second beam quality monitoring signals, and determining, based on the signal quality of each of the N second beam quality monitoring signals, beam qualities of the second beams used for transmitting the second beam quality monitoring signals; generating, by the user equipment, a second detection report, and transmitting, by the user equipment, the second detection report to the network device, wherein the second detection report comprises at least one of: indication information of at least one beam of which the beam quality satisfies the second threshold among the N second beams, or the beam quality of at least one beam of which the beam quality satisfies the second threshold among the N second beams;

wherein a beam communication quality represented by the second threshold is higher than or equal to a beam communication quality represented by the first threshold.

2. The method according to claim 1, wherein the first detection report specifically comprises at least one of:
- indication information of all of L1 beams of which beam qualities do not satisfy the first threshold among the first beams; or,
- beam qualities of K1 beams with the best or worst beam qualities among the L1 beams, wherein K1 is 1, or K1 is smaller one of L1 and H, and H is a maximum number of beam qualities carried by uplink resources used by the user equipment to transmit the first detection report; or,
- indication information of K2 beams with the best or worst beam qualities among beams of which beam qualities do not satisfy the first threshold among the first beams; or,
- the beam quality of at least one of the K2 beams; or,
- indication information of all of L2 beams of which beam qualities satisfy the second threshold among the second beams; or,
- beam qualities of K3 beams with the best or worst beam qualities among the L2 beams, wherein K3 is 1, or K3 is smaller one of L2 and H, and H is a maximum number of beam qualities carried by uplink resources used by the user equipment to transmit the first detection report; or,
- indication information of K4 beams with the best or worst beam qualities among beams of which beam qualities satisfy the second threshold among the second beams; or,
- the beam quality of at least one of the K4 beams.

3. The method according to claim 1, wherein the second detection report specifically comprises at least one of:
- indication information of all of L2 beams of which beam qualities satisfy the second threshold among the second beams; or,
- beam qualities of K3 beams with the best or worst beam qualities among the L2 beams, wherein K3 is 1, or K3 is smaller one of L2 and H, and H is a maximum number of beam qualities carried by uplink resources used by the user equipment to transmit the first detection report; or,
- indication information of K4 beams with the best or worst beam qualities among beams of which beam qualities satisfy the second threshold among the second beams; or, the beam quality of at least one of the K4 beams.

4. The method according to claim 1, wherein the indication information and/or beam qualities in the first detection report is sorted by at least one of followings schemes:
- when the first detection report comprises indication information of at least two first beams, the indication information of the at least two first beams is sorted according to beam qualities of beams; or,
- when the first detection report comprises beam qualities of at least two first beams, the beam qualities of the at least two first beams are sorted according to beam qualities of beams; or
- when the first detection report comprises indication information of at least two second beams, the indication information of the at least two second beams is sorted according to beam qualities of beams; or
- when the first detection report comprises beam qualities of at least two second beams, the beam qualities of the at least two second beams are sorted according to beam qualities of beams.

5. The method according to claim 1, wherein the first detection report further comprises at least one of:
- indication information indicating the quantity of indication information of the at least one beam of which beam quality does not satisfy the first threshold in the first detection report; or,
- indication information indicating the quantity of the beam quality of the at least one beam of which the beam quality does not satisfy the first threshold in the first detection report; or,
- indication information indicating the quantity of indication information of the at least one beam of which the beam quality satisfies the second threshold in the first detection report; or, indication information indicating the quantity of the beam quality of the at least one beam of which the beam quality satisfies the second threshold in the first detection report; or, indication information indicating a position of indication information of the at least one beam of which the beam quality does not satisfy the first threshold in the first detection report; or, indication information indicating a position of the beam quality of the at least one beam of which the beam quality does not satisfy the first threshold in the first detection report; or, indication information indicating a position of indication information of the at least one beam of which the beam quality satisfies the second threshold in the first detection report; or, indication information indicating a position of the beam quality of the at least one beam of which the beam quality satisfies the second threshold in the first detection report; or, information indicating a type of the first detection report, wherein the type of the first detection report comprises at least one type of: a detection report of beams not satisfying the first threshold, a detection report of beams satisfying the second threshold, and a detection report of beams not satisfying the first threshold and beams satisfying the second threshold.

6. The method according to claim 1, wherein transmitting, by the user equipment, the first detection report to the network device, comprises:

when transmitting of the first detection report by the user equipment on first uplink resource for transmitting the first detection report collides with transmitting of a third signal to the network device on second uplink resource, then:

cancelling, by the user equipment, the transmitting of the third signal on the second uplink resource, and transmitting the first detection report on the first resource; or cancelling, by the user equipment, the transmitting of the third signal on the second uplink resource, and transmitting the first detection report and the third signal on the first resource; or cancelling, by the user equipment, the transmitting of the first detection report on the first uplink resource, and transmitting the first detection report on the second resource; or cancelling, by the user equipment, the transmitting of the first detection report on the first uplink resource, and transmitting the first detection report and the third signal on the second resource.

7. The method according to claim 1, wherein the user equipment receives configuration information transmitted by the network device before receiving the beam quality monitoring signals transmitted by the network device, wherein the configuration information is used for indicating the user equipment to receive the beam quality monitoring signals according to indicated configuration parameters; and/or, wherein the user equipment further receives second configuration information transmitted by the network device before generating the first detection report, wherein the configuration information comprises at least one of:

indication information indicating the quantity of indication information of the at least one beam of which the beam quality does not satisfy the first threshold in the first detection report; or, indication information indicating the quantity of the beam quality of the at least one beam of which the beam quality does not satisfy the first threshold in the first detection report; or, indication information indicating the quantity of indication information of the at least one beam of which the beam quality satisfies the second threshold in the first detection report; or, indication information indicating the quantity of the beam quality of the at least one beam of which the beam quality satisfies the second threshold in the first detection report; or, indication information indicating a position of indication information of the at least one beam of which the beam quality does not satisfy the first threshold in the first detection report; or, indication information indicating a position of the beam quality of the at least one beam of which the beam quality does not satisfy the first threshold in the first detection report; or, indication information indicating a position of indication information of the at least one beam of which the beam quality satisfies the second threshold in the first detection report; or, indication information indicating a position of the beam quality of the at least one beam of which the beam quality satisfies the second threshold in the first detection report; or, information indicating a type of the first detection report, wherein the type of the first detection report comprises at least one type of: a detection report of beams not satisfying the first threshold, a detection report of beams satisfying the second threshold, and a detection report of beams not satisfying the first threshold and beams satisfying the second threshold; or, information indicating a maximum amount of beam indication information allowed to be contained in the first detection report; or, information indicating a maximum number of beam qualities allowed to be contained in the first detection report.

8. A user equipment, comprising:
a memory configured to store computer instructions;
a communication interface configured to communicate with a network device;
a processor connected communicatively to the memory and the communication interface respectively and configured to execute the computer instructions to perform the method of claim 1 when executing the computer instructions.

9. A beam detection method, comprising:
transmitting, by a network device, beam quality monitoring signals using M beams, wherein the beam quality monitoring signals are signals used for monitoring beam quality and M is a positive integer;

receiving, by the network device, a first detection report transmitted by a user equipment, wherein the M beams comprise M1 first beams that have been determined to be available for communication with the user equipment and M2 second beams that have not been determined to be used for communication with the user equipment, the first detection report comprises:

at least one of indication information of at least one beam of which the beam quality does not satisfy a first threshold among the M1 first beams, or the beam quality of at least one beam of which the beam quality does not satisfy the first threshold among the M1 first beams, and at least one of indication information of at least one beam of which the beam quality satisfies a second threshold among the M2 second beams, or the beam quality of at least one beam of which the beam quality satisfies the second threshold among the M2 second beams;

wherein a beam communication quality represented by the second threshold is higher than or equal to a beam communication quality represented by the first threshold; or receiving, by the network device, a first detection report transmitted by the user equipment, wherein the M beams are first beams that have been determined to be available for communication with the user equipment, the first detection report comprises at least one of: indication information of at least one beam of which the beam quality does not satisfy the first threshold among the M first beams, or the beam quality of at least one beam of which the beam quality does not satisfy the first threshold among the M first beams; transmitting, by the network device, second beam quality monitoring signals to the user equipment using N second beams, wherein the second beams are beams that has not been determined to be used for communication with the user equipment and N is a positive integer; receiving, by the network device, a second detection report reported by the user equipment, wherein the second detection report comprises at least one of: indication information of at least one beam of which the beam quality satisfies the second threshold among the N second beams, or the beam quality of at least one beam of which the beam quality satisfies the second threshold among the N second beams;

wherein a beam communication quality represented by the second threshold is higher than or equal to a beam communication quality represented by the first threshold.

10. The method according to claim 9, wherein the method further comprises:
deleting, by the network device, at least one beam of which the beam quality does not satisfy the first threshold from the first beams; and/or, adding at least one second beam of which the beam quality satisfies the second threshold to the first beams.

11. The method according to claim 9, wherein the network device further transmits configuration information to the user equipment before transmitting the beam quality monitoring signals to the user equipment, wherein the configuration information is used for indicating the user equipment to receive the beam quality monitoring signals according to indicated configuration parameters;

and/or, wherein the network device further transmits second configuration information to the user equipment, wherein the second configuration information comprises at least one of:
indication information indicating a type of the first detection report reported by the user equipment; or,
indication information indicating the quantity of indication information of the at least one beam of which the beam quality does not satisfy the first threshold in the first detection report; or,
indication information indicating the quantity of the beam quality of the at least one beam of which beam quality does not satisfy the first threshold in the first detection report; or,
indication information indicating the quantity of indication information of the at least one beam of which the beam quality satisfies the second threshold in the first detection report; or,
indication information indicating the quantity of the beam quality of the at least one beam of which the beam quality satisfies the second threshold in the first detection report; or,
indication information indicating a position of indication information of the at least one beam of which the beam quality does not satisfy the first threshold in the first detection report; or,
indication information indicating a position of the beam quality of the at least one beam of which the beam quality does not satisfy the first threshold in the first detection report; or,
indication information indicating a position of indication information of the at least one beam of which the beam quality satisfies the second threshold in the first detection report; or,
indication information indicating a position of the beam quality of the at least one beam of which the beam quality satisfies the second threshold in the first detection report; or,
information indicating a maximum amount of beam indication information allowed to be contained in the first detection report; or,
information indicating a maximum number of beam qualities allowed to be contained in the first detection report.

12. The method according to claim 9, wherein receiving, by the network device, the first detection report transmitted by the user equipment, comprises:
when transmitting of the first detection report by the user equipment on first uplink resource for transmitting the first detection report collides with transmitting of a third signal to the network device on second uplink resource, then:
cancelling, by the network device, reception of the third signal transmitted on the second uplink resource, and receiving the first detection report transmitted on the first resource; or
cancelling, by the network device, reception of the third signal transmitted on the second uplink resource, and receiving the first detection report and the third signal transmitted on the first resource; or
cancelling, by the network device, reception of the first detection report transmitted on the first uplink resource, and receiving the first detection report transmitted on the second resource; or
cancelling, by the network device, reception of the first detection report transmitted on the first uplink resource, and receiving the first detection report and the third signal transmitted on the second resource.

13. The method according to claim 9, wherein the network device blindly detects the first detection report according to a blind detection rule after receiving the first detection report transmitted by the user equipment.

14. A network device, comprising:
a memory configured to store computer instructions;
a communication interface configured to communicate with a user equipment;
a processor connected communicatively to the memory and the communication interface respectively and configured to execute the computer instructions to perform the method of claim 9 when executing the computer instructions.

* * * * *